(12) United States Patent
Ruth et al.

(10) Patent No.: US 10,809,745 B2
(45) Date of Patent: Oct. 20, 2020

(54) SYSTEM AND METHOD OF LAST MILE DELIVERY

(71) Applicant: Motogo, LLC, Austin, TX (US)

(72) Inventors: David Brian Ruth, Austin, TX (US); Yuan-Chang Lo, Austin, TX (US)

(73) Assignee: MOTOGO, LLC, Austin, TX (US)

( * ) Notice: Subject to any disclaimer, the term of this patent is extended or adjusted under 35 U.S.C. 154(b) by 0 days.

(21) Appl. No.: 16/247,470

(22) Filed: Jan. 14, 2019

(65) Prior Publication Data

US 2019/0220044 A1    Jul. 18, 2019

Related U.S. Application Data

(60) Provisional application No. 62/617,479, filed on Jan. 15, 2018.

(51) Int. Cl.
| | | |
|---|---|---|
| *G05D 1/12* | (2006.01) | |
| *G05D 1/02* | (2020.01) | |
| *G05D 1/10* | (2006.01) | |
| *B60P 3/06* | (2006.01) | |
| *G06Q 50/28* | (2012.01) | |
| *G06Q 10/00* | (2012.01) | |
| *G06Q 50/30* | (2012.01) | |
| *G06Q 10/08* | (2012.01) | |
| *B64C 39/02* | (2006.01) | |

(52) U.S. Cl.
CPC ............... *G05D 1/12* (2013.01); *B60P 3/06* (2013.01); *G05D 1/0206* (2013.01); *G05D 1/0276* (2013.01); *G05D 1/0287* (2013.01); *G05D 1/0295* (2013.01); *G05D 1/104* (2013.01); *G06Q 10/00* (2013.01); *G06Q 10/083* (2013.01); *G06Q 50/28* (2013.01); *G06Q 50/30* (2013.01); *B64C 39/024* (2013.01); *B64C 2201/128* (2013.01)

(58) Field of Classification Search
None
See application file for complete search history.

(56) References Cited

U.S. PATENT DOCUMENTS

| | | | |
|---|---|---|---|
| 2016/0185466 A1* | 6/2016 | Dreano, Jr. | G06Q 30/0635 705/26.81 |
| 2017/0032258 A1* | 2/2017 | Miresmailli | A01G 7/00 |
| 2017/0129603 A1* | 5/2017 | Raptopoulos | B64C 39/024 |
| 2017/0313421 A1* | 11/2017 | Gil | H04W 4/70 |
| 2018/0158018 A1* | 6/2018 | Luckay | G06Q 10/0832 |
| 2018/0186454 A1* | 7/2018 | Luckay | B64D 1/12 |
| 2018/0205682 A1* | 7/2018 | O'Brien, V | G03H 1/0005 |
| 2018/0300834 A1* | 10/2018 | High | G06Q 50/28 |
| 2019/0043001 A1* | 2/2019 | Woulfe | G01C 21/3438 |
| 2019/0070995 A1* | 3/2019 | Cantrell | B60P 3/007 |
| 2019/0196479 A1* | 6/2019 | Kaneko | G05D 1/0212 |
| 2019/0196511 A1* | 6/2019 | Millhouse | B64C 39/024 |

* cited by examiner

*Primary Examiner* — Tamara L Weber
(74) *Attorney, Agent, or Firm* — Moore Intellectual Property Law, PLLC

(57) ABSTRACT

A vehicle includes a storage unit configured to store a plurality of package containers. Each package container of the plurality of package containers is associated with a corresponding destination. The vehicle includes a package manipulator configured to move a first package container of the plurality of package containers from the storage unit to a first drone. The first drone is configured to move the first package container to a first destination corresponding to the first package container.

20 Claims, 17 Drawing Sheets

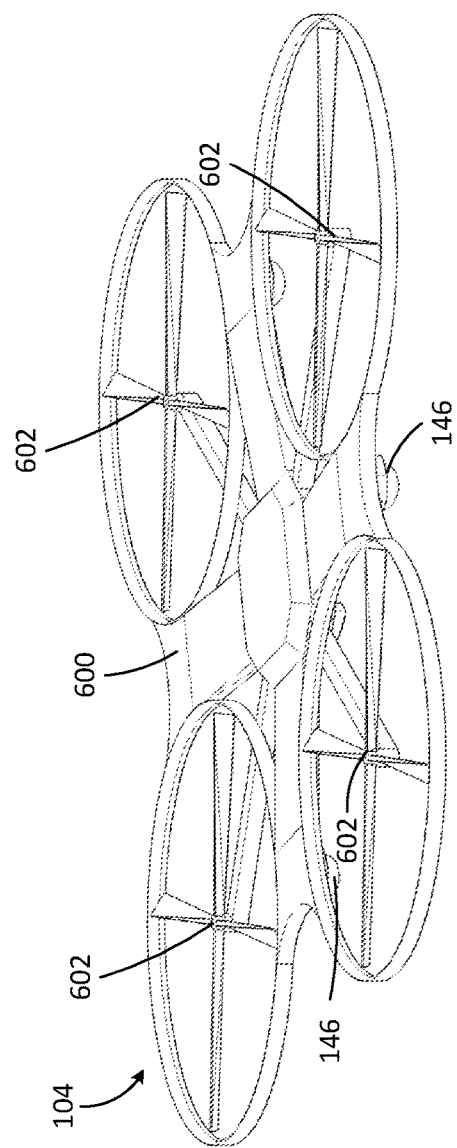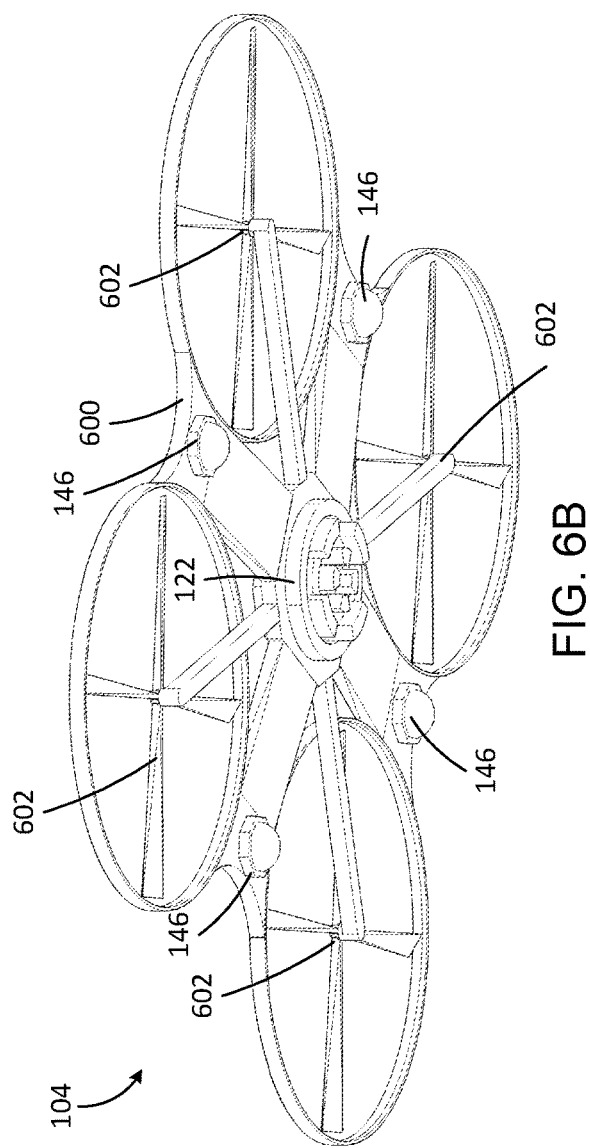
FIG. 6A
FIG. 6B

SYSTEM AND METHOD OF LAST MILE DELIVERY

CROSS-REFERENCE TO RELATED APPLICATION

The present application claims priority from U.S. Provisional Application No. 62/617,479, filed Jan. 15, 2018, entitled "SYSTEM AND METHOD OF LAST MILE DELIVERY," which is incorporated by reference herein in its entirety.

BACKGROUND

The present disclosure relates to the secure delivery of objects and packages. More specifically, the present disclosure relates to a system which improves both security and delivery.

SUMMARY

In one embodiment, the disclosure provides a system for package delivery. In some embodiments, the system for package delivery includes a package container, an autonomous delivery platform, a first multi-use vehicle, and a package container reception point. In some embodiments, the package container includes a transport space defined by a plurality of walls and a container communication interface configured to transmit and receive a first plurality of logistics parameters. In some embodiments, the autonomous delivery platform includes a delivery platform communication interface configured to transmit and receive a second plurality of logistics parameters, at least one delivery platform sensor configured to collect environmental data, and a mechanical interchange configured to transfer the package container on and off of the autonomous delivery platform. In some embodiments, the second plurality of logistics parameters includes at least a portion of the first plurality of logistics parameters. In some embodiments, the mechanical interchange is configured to transfer the package container between the autonomous delivery platform and another vehicle or attachment point.

In some embodiments, the first multi-use vehicle includes a first vehicle communication interface and a vehicular electromechanical interface. In some embodiments, the first vehicle communication interface is configured to transmit and receive a third plurality of logistics parameters. In some embodiments, the third plurality of logistics parameters includes at least a portion of the first plurality of logistics parameters. In some embodiments, the vehicular electromechanical interface is configured to releasably couple the package container to the first multi-use vehicle. In some embodiments, the package container reception point includes a reception point communication interface and an anchored electromechanical interface. In some embodiments, the reception point communication interface is configured to transmit and receive a fourth plurality of logistics parameters. In some embodiments, the fourth plurality of logistics parameters includes at least a portion of the first plurality of logistics parameters. In some embodiments, the anchored electromechanical interface is configured to releasably couple the package container to the package container reception point.

In some embodiments, the system further includes a second multi-use vehicle. In some embodiments, the second multi-use vehicle includes a second vehicle communication interface, at least one vehicle sensor, and a second vehicular electromechanical interface. In some embodiments, the second vehicle communication interface is configured to transmit and receive a fifth plurality of logistics parameters. In some embodiments, the fifth plurality of logistics parameters includes at least a portion of the first plurality of logistics parameters. In some embodiments, the at least one vehicle sensor is configured to collect environmental data. In some embodiments, the second vehicular electromechanical interface is configured to releasably couple the package container to the second multi-use vehicle.

In some embodiments, the first multi-use vehicle is configured as a land-based delivery vehicle, such as a wheeled vehicle or bipedal robot. In some embodiments, the second multi-use vehicle is configured as an aerial second multi-use vehicle, such as a drone, plane, or quadcopter. In some embodiments, the first multi-use vehicle and the second multi-use vehicle are configured for real-time adaptive navigation. For example, based on the environmental data collected by the at least one vehicle sensors of the second multi-use vehicle.

In some embodiments, the package container further includes a package container electromechanical interface. In some embodiments, the package container electromechanical interface is configured to releasably couple to at least one of the mechanical interchange, the vehicular electromechanical interface, and the anchored electromechanical interface. In some embodiments, at least two of the mechanical interchange, the vehicular electromechanical interface, the anchored electromechanical interface, and the package container electromechanical interface are configured as universal connectors. In some embodiments, the universal connectors are further configured for power and data transfer between the universal connectors. For example, transfer of a portion of a plurality of logistics parameters.

In some embodiments, the disclosure provides a method for package delivery. In some embodiments, the method for package delivery includes providing a package delivery system. In some embodiments, the package delivery system includes an autonomous delivery platform, a first multi-use vehicle, and a package container reception point. In some embodiments, the method further includes transporting the package container. For example, transporting the package container on the autonomous delivery platform. In some embodiments, the method further includes monitoring a package container destination with one or more sensors. In some embodiments, the one or more sensors are associated with at least one of the autonomous delivery platform, the first multi-use vehicle, and the package container reception point. In some embodiments, the method includes transferring the package container from the autonomous delivery platform to the first multi-use vehicle. In some embodiments, the method includes transferring the package container from the first multi-use vehicle to the package container reception point.

In some embodiments, the package delivery system further includes a second multi-use vehicle. In some embodiments, the first multi-use vehicle is configured as a land-based delivery vehicle, and the second multi-use vehicle is configured as an aerial second multi-use vehicle. In some embodiments, the method of package delivery further includes adapting a delivery route of the package container. In some embodiments, the adapting of the delivery route is based, at least in part, on environmental data collected from one or more sensors associated with at least one of the autonomous delivery platform and the first multi-use vehicle. In some embodiments, the method for package delivery further includes receiving a user input indicative of the package container destination. In some embodiments, the adapting the delivery route of the package container is further based, at least in part, on the received user input.

In some embodiments, the method of package delivery further includes coupling the package container to at least one of the autonomous delivery platform, the first multi-use vehicle, and the package container reception point via an electromechanical interface. In some embodiments, the method for package delivery further includes transmitting one or more of data and electrical power via the electromechanical interface. In some embodiments, the method for package delivery includes recoding at least two logs of the transfer of the package container from the autonomous delivery platform to the first multi-use vehicle, and at least two logs of the transfer of the package container from the first multi-use vehicle to the package container reception point. In some embodiments, a first log of the transfer of the package container from the autonomous delivery platform to the first multi-use vehicle is recorded within the package container. In some embodiments, a second log of the transfer of the package container from the autonomous delivery platform to the first multi-use vehicle is recorded within at least one of the autonomous delivery platform and the first multi-use vehicle. In some embodiments, a first log of the transfer of the package container from the first multi-use vehicle to the package container reception point is recorded within the package container. In some embodiments, a second log of the transfer of the package container from the first multi-use vehicle to the package container reception point is recorded within at least one of the first multi-use vehicle and the package container reception point.

In some embodiments, the disclosure provides non-transitory computer-readable medium storing program instructions. In some embodiments, the program instructions are executable by one or more processors to receive a first plurality of logistics parameters, generate a primary route, and generate a secondary route, for example, based on the first plurality of logistics parameters. In some embodiments, the first plurality of logistics parameters is received from a package container at a package transport system. In some embodiments, the package transport system includes an autonomous delivery platform, a first multi-use vehicle, and a package container reception point. In some embodiments, the first plurality of logistics parameters includes a package container pickup location and a package container destination location. In some embodiments, the primary route is generated for the autonomous delivery platform between the package container pickup location and an intermediary location. In some embodiments, the intermediary position is geographically proximate the package container destination. In some embodiments, the secondary route is generated for the first multi-use vehicle between the intermediary location and the package container destination location. In some embodiments, the program instructions are further executable to transfer the package container from the autonomous delivery platform to the first multi-use vehicle. For example, executable to control a mechanical interface of the autonomous delivery platform. In some embodiments, the program instructions are further executable to transfer the package container from the first multi-use vehicle to the package container reception point. For example, to control an electromechanical interface of the package container reception point.

In some embodiments, the package container transport system further includes a second multi-use vehicle. In some embodiments, the first multi-use vehicle is configured as a land-based delivery vehicle and the second multi-use vehicle is configured as an aerial surveying vehicle. In some embodiments, the program instructions are further executable to detect environmental data with a sensor associated with at least one of the autonomous delivery platform, the first multi-use vehicle, and the package container reception point. In some embodiments, the program instructions are further executable to adapt at least one of the primary route and the secondary route based, at least in part, on the environmental data. In some embodiments, the program instructions are further executable to transmit a second plurality of logistics parameters between an electromechanical interface on the package container and a second electromechanical interface on at least one of the autonomous delivery platform, the first multi-use vehicle, and the package container reception point. In some embodiments, the second plurality of logistics parameters includes at least a portion of the first plurality of logistics parameters.

In some embodiments, the program instructions are further executable to record a log of the transferring the package container from the autonomous delivery platform to the first multi-use vehicle within the package container. In some embodiments, the program instructions are further executable to record a log of the transferring the package container from the autonomous delivery platform to the first multi-use vehicle within at least one of the autonomous delivery platform and the first multi-use vehicle. In some embodiments, the program instructions are further executable to record a log of the transferring the package container from the first multi-use vehicle to the package container reception point within the package container. In some embodiments, the program instructions are further executable to record a log of the transferring the package container from the first multi-use vehicle to the package container reception point within at least one of the first multi-use vehicle and the package container reception point.

In some embodiments, the program instructions are further executable to receive a user input indicative of supplementary logistics parameters. In some embodiments, the program instructions are further executable to adapt at least one of the primary route and the secondary route based, at least in part, on the user input. In some embodiments, the program instructions are further executable to transmit a distress signal. For example, a distress signal in communicated between one or more of the autonomous delivery platform, the first multi-use vehicle, the package container reception point, the second multi-use vehicle, and the package container. In some embodiments, the distress signal may be transmitted to an external device or system.

Other aspects of the disclosure will become apparent by consideration of the detailed description and accompanying drawings.

BRIEF DESCRIPTION OF THE DRAWINGS

FIG. 6A is a first perspective view of a second multi-use vehicle, according to some embodiments.

FIG. 6B is a second perspective view of the second multi-use vehicle of FIG. 6A.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways.

Figure 1:
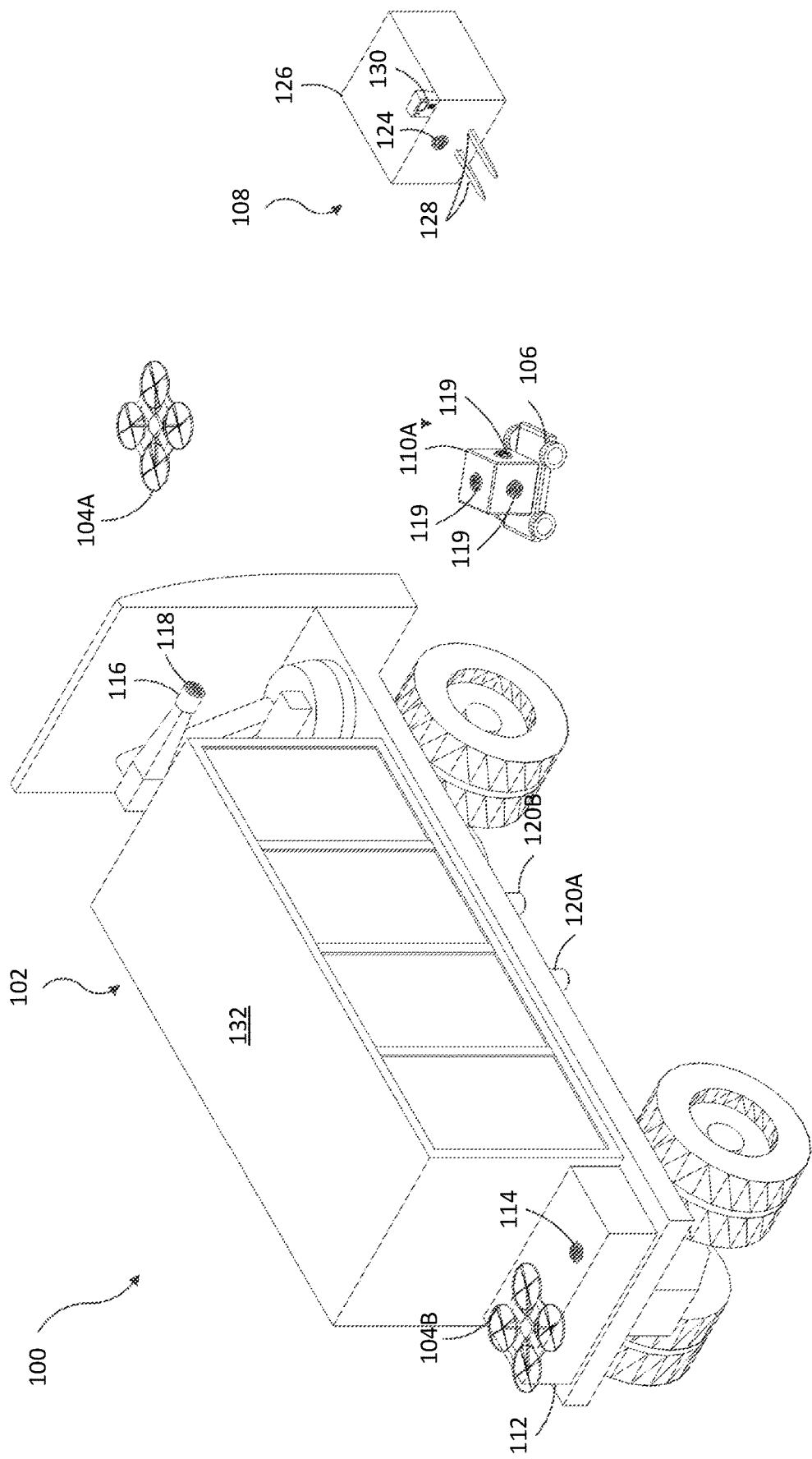
FIG. 1 illustrates a system for package delivery, according to some embodiments.
Figure 2:
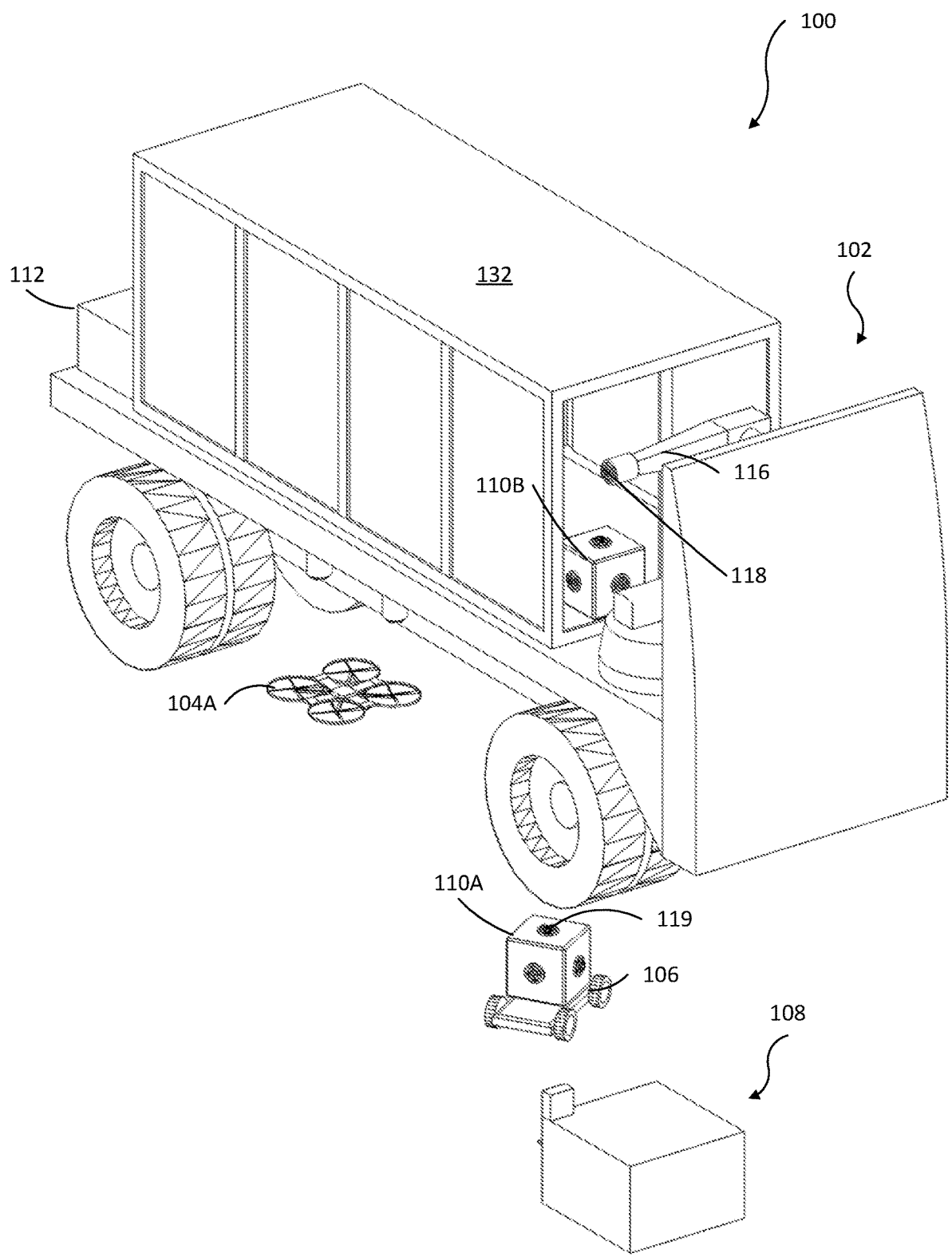
FIG. 2 illustrates the system for package delivery of FIG. 1.

FIGS. 1 and 2 illustrate a system 100 for package delivery, according to some embodiments. The system 100 includes an autonomous delivery platform 102, a first multi-use vehicle 106, a second multi-use vehicle 104, and a package container reception point 108. In the illustrated embodiment, the autonomous delivery platform 102 is a truck, but other vehicles may additionally or alternatively be used. For example, cars, motorcycles, hovercraft, ships, submersible vessels, aircraft, and spacecraft may be configured to implement embodiments described variously herein. The autonomous delivery platform 102 is configured for transporting an object in a package container 110. The autonomous delivery platform 102 includes a first energy storage device 112, for example, a battery or fuel tank. In some embodiments, the autonomous delivery platform 102 may include more than one energy storage device. For example, the autonomous delivery platform 102 may include a fuel tank and motor, and the motor is configured to drive a power takeoff unit electrically coupled to a battery.

The autonomous delivery platform 102 also includes a delivery platform electromechanical interface 114 and a mechanical package container interchange. In the illustrated embodiment, the delivery platform electromechanical interface 114 is electrically coupled to the first energy storage device 112. Additionally, the mechanical package container interchange 116, illustrated as a robotic arm, is also coupled to the first energy storage device 112. In some embodiments, the mechanical package container interchange 116 may alternatively include one or more lifts, conveyor belts, rollers, and the like, configured to facilitate transfer of the package container 110 to or from the autonomous delivery platform 102. The mechanical package container interchange 116 includes a second delivery platform electromechanical interface 118, configured for mating with a package container electromechanical interface 119 of the package container 110 and loading or offloading the package container 110 from the autonomous delivery platform 102. Accordingly, objects mated with the second delivery platform electromechanical interface 118 may be electrically coupled to one or more systems on the autonomous delivery platform 102, such as the first energy storage device 112. In some embodiments, the autonomous delivery platform 102 may include various additional attachment points, including respective electromechanical interfaces, such as first multi-use vehicle attachment points 120A and 120B. In the illustrated embodiment, the vehicle attachment points 120 are adjustable columns extending from an underside of the autonomous delivery platform 102. Accordingly, the vehicle attachment points 120 may be extended downward to interface with a package container 110, vehicle, or the like, and be retracted during transit of the autonomous delivery platform 102.

The second multi-use vehicle 104, also referred to as an aerial surveying vehicle, drone, or quadcopter, includes a second vehicular electromechanical interface 122. In some embodiments, for example as depicted in FIG. 6B, the second vehicular electromechanical interface 122 is configured to releasably couple to the delivery platform electromechanical interface 114, electrically coupling the second multi-use vehicle 104 to the first energy storage device 112. Accordingly, the second multi-use vehicle 104 may be securely transported on the autonomous delivery platform 102. Further, the second multi-use vehicle 104 may receive power from the first energy storage device 112, for example, to recharge an onboard battery of the second multi-use vehicle 104. In some embodiments, the second multi-use vehicle 104 may transmit or receive data with the autonomous delivery platform 102 across the delivery platform electromechanical interface 114.

The package container reception point 108 includes an anchored electromechanical interface 124, configured to releasably couple to the package container electromechanical interface 119 of the package container 110. In the illustrated embodiment, the package container reception point 108 is mounted to a concrete housing 126 which includes a pair of support forks 128 or arms and a user interface 130. The user interface 130 is operably coupled to the package container reception point 108. In some embodiments, a package container reception point 108 may include more or different features. For example, a package container reception point 108 may be mounted to a wall of a building, or otherwise anchored to a structure. Accordingly, a package container 110 coupled to the package container reception point 108 is secured to the structure. In some embodiments, the package container reception point 108 may be operably coupled with a user interface remote from a mounting point or housing of the package container reception point 108. For example, the package container reception point 108 may be in wireless communication with an electronic device and may be configured to release a package container in response to a user identification, an unlock code, or the like.

Figure 8:
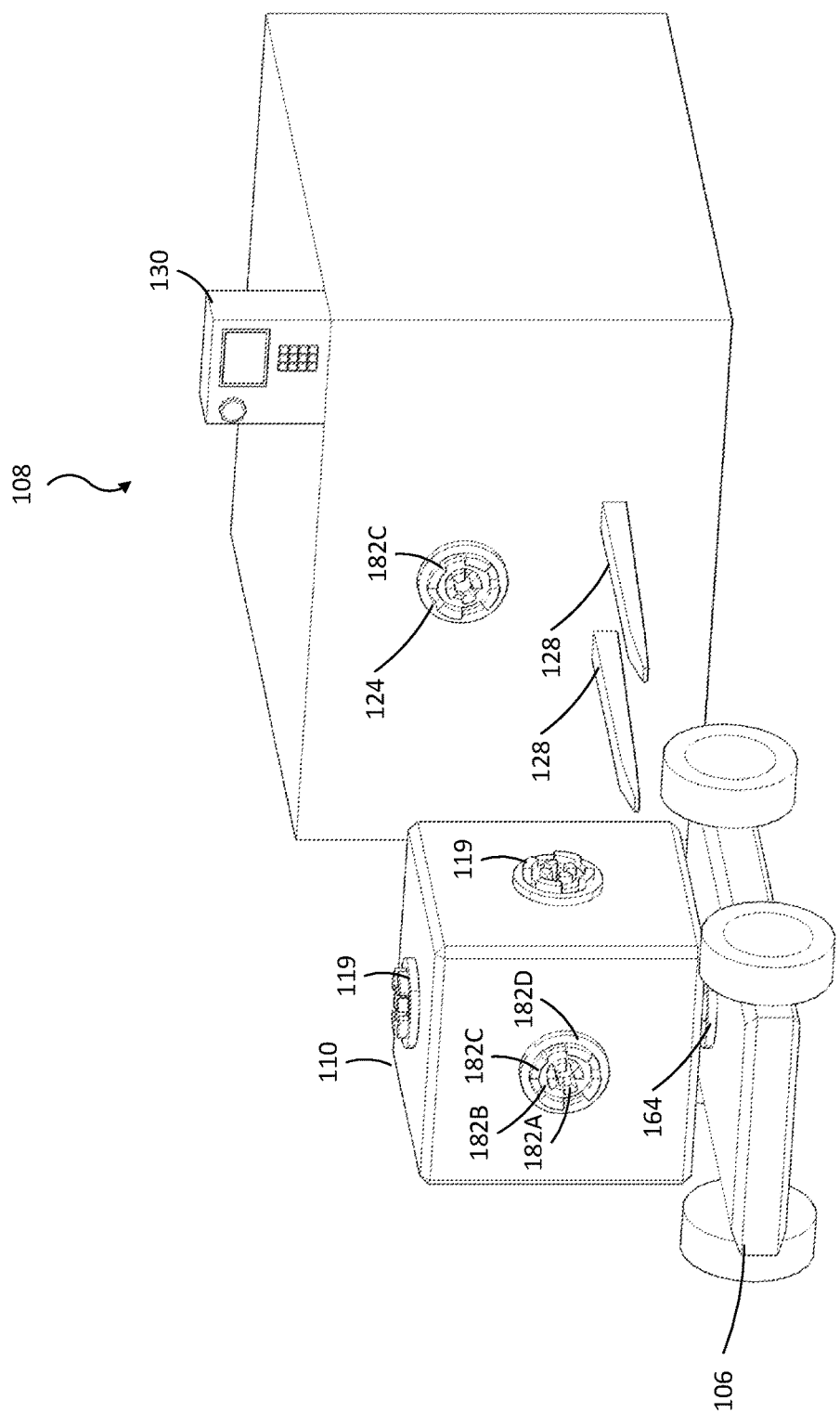
FIG. 8 illustrates a system for package delivery, according to some embodiments.

The first multi-use vehicle 106, illustrated as an electric vehicle, includes a vehicular electromechanical interface (see, e.g. FIG. 8). In some embodiments, the first multi-use vehicle may be embodied in other configurations, for example a bipedal or quadrupedal robot. Accordingly, the first multi-use vehicle may be configured to navigate various terrains and obstacles, such as many human-navigable environments. In some embodiments, the vehicular electromechanical interface is configured for releasably coupling to the package container electromechanical interface 119 of the package container 110. Accordingly, the first multi-use vehicle 106 may transfer or receive package containers 110 from the autonomous delivery platform 102. In further embodiments, the vehicular electromechanical interface may be configured for delivering the package container 110 to the package container reception point 108. For example, the vehicular electromechanical interface may be configured to only release once positive engagement of the package container 110 with the package container reception point 108 is confirmed. For example, the package container reception point 108 may be configured to transmit electrical power and data via the package container 110 to the first multi-use vehicle 106. Accordingly, the package container reception point 108, package container 110, and first multi-use vehicle 106 are electrically coupled. In some embodiments, one or more of the first multi-use vehicle 106, package container 110, and package container reception point 108 may record a log of package container transfers.

In one embodiment, if a package container is already coupled to the package container reception point 108, package container 110 may additionally be coupled to the package container reception point 108. Alternatively, the package container 110 may be coupled to the package container already coupled to the container reception point 108 or may be coupled to a different package container reception point.

In some embodiments, the autonomous delivery platform 102, the second multi-use vehicle 104, and the first multi-use vehicle 106 are in wireless communication, for example, over a wireless network. In some embodiments, the first multi-use vehicle 106 may be configured to releasably couple to the vehicle attachments points 120A or 120B, for example, over the vehicular electromechanical interface. Accordingly, the first multi-use vehicle 106 may additionally be transported by the autonomous delivery platform 102. In some embodiments, the first multi-use vehicle 106 is further configured to receive electrical power and data across the vehicle attachment point 120, for example, from the first energy storage device 112. In other embodiments, first multi-use vehicles 106 may be assigned a geographic region, such as a neighborhood, and respond to transmissions from the autonomous delivery platform 102, such as a delivery alert or package container return request.

FIG. 2 illustrates a second perspective view of the system 100. A second package container 110B is transported in an interior of a package container storage unit 132 onboard the autonomous delivery platform 102. In some embodiments, the package container storage unit 132 is configured to releasably couple to the autonomous delivery platform 102. For example, the autonomous delivery platform 102 may receive a plurality of package container storage units 132. The package containers 110 may have been previously secured within the package container storage unit 132. Alternatively, the package containers 110 may be received by the mechanical package container interchange 116, which may then arrange them within the package container storage unit 132.

In some embodiments, package delivery may include delivery to a package container reception point 108. For example, the autonomous delivery platform 102 may transport a plurality of package containers 110. In some embodiments, a package container 110 is associated with a destination and/or delivery route. For example, a destination may include GPS coordinates, a mailing address, an identifier of a package container reception point 108, or a location and identifier of a user associated with the package container 110. Accordingly, in some embodiments, the autonomous delivery platform 102 may be configured to follow a prescribed route between destinations. Alternatively, the autonomous delivery platform 102 may be configured for collaborative real-time adaptive routing. For example, a road may be obstructed by a fallen tree, and a field of view of various imaging sensors of the autonomous delivery platform 102 may be obstructed by surrounding trees. Accordingly, the second multi-use vehicle 104 may be released to scout a surrounding area, and wirelessly communicate image and environmental data to the autonomous delivery platform 102. In some embodiments, the autonomous delivery platform 102 may transport two or more second multi-use vehicles 104. Accordingly, second multi-use vehicles 104 may be cycled between use and charge cycles, while at least one second multi-use vehicle 104 provides additional monitoring to the autonomous delivery platform 102. For example, the autonomous delivery platform 102 may be transporting package containers 110 through sever weather, such as a rain storm. Rain may partially obscure imaging data of collected by the autonomous delivery platform 102. Accordingly, one or more second multi-use vehicles 104 may be deployed to provide additional imaging and environmental data. By way of further example, the autonomous delivery platform 102 may be transporting package containers 110 through hazardous conditions, such as black ice, which may be difficult to detect and safely navigate. Accordingly, one or more second multi-use vehicles 104 may be deployed to identify hazardous conditions or other transportation obstacles, for example, with one or more imaging devices, environmental sensors, and the like, and perform collaborative real-time adaptive routing with the autonomous delivery platform 102. Further, in some embodiments, one or more second multi-use vehicles 104 may be dimensioned or configured differently. For example, a first second multi-use vehicle 104 may be smaller and more agile than a larger and more powerful second multi-use vehicle 104.

In some embodiments, the second multi-use vehicle 104 may be configured for collaborative real-time adaptive routing with one or more first multi-use vehicles 106. For example, the autonomous delivery platform 102 and second multi-use vehicle 104 may be approaching a neighborhood which includes a package destination, such as a package container reception point 108 mounted to a house. The second multi-use vehicle 104 may be deployed ahead of an arrival of the autonomous delivery platform 102 and wirelessly communicate with one or more neighborhood first multi-use vehicles 106 to coordinate transfer of the package container 110 from the autonomous delivery platform 102 to the first multi-use vehicle 106. Accordingly, delays may be reduced. Alternatively, or additionally, the one or more neighborhood first multi-use vehicles 106 may be assigned to a neighborhood and receiver power from one or more container reception points 108 associated with a house or community center within the neighborhood. Further, the neighborhood first multi-use vehicles may be configured for pickup of packages or return of package containers 110. Accordingly, pickup delay of packages and package containers 110 may be reduced. Additionally, as the package container reception points 108 and autonomous delivery platform 102 may be more resistant to theft than a first multi-use vehicle 106, potential vulnerability of the first multi-use vehicle 106 is mitigated. Further, in some embodiments, the second multi-use vehicle 104 may be configured to releasably couple to the first multi-use vehicle 106. For example, in the case that the first multi-use vehicle 106 is impaired, the first multi-use vehicle 106 may transmit a distress signal over a wireless connection, for example, to the autonomous delivery platform 102 or the second multi-use vehicle 104. Responsive to the distress signal, the second multi-use vehicle 104 may approach the first multi-use vehicle 106, couple to the first multi-use vehicle 106, and transport the first multi-use vehicle 106 to safety. Alternatively, in the case that the first multi-use vehicle 106 only suffers from an energy shortage, for example, depleted batteries, the second multi-use vehicle 104 may transmit electrical power across an electromechanical interface to recharge the first multi-use vehicle 106.

In some embodiments, a distress signal may be transmitted between or among components of the system 100. For example, the first multi-use vehicle 106 may transmit a distress signal indicating that it is malfunctioning. In other embodiments, the first multi-use vehicle 106 may transmit a distress signal indicating that it has detected a problem with the second multi-use vehicle 104, for example, with one or more sensors associated with the first multi-use vehicle 106. In other embodiments, the autonomous delivery platform 102 may transmit a distress signal indicating that it has detected a problem with the delivery route, for example, an obstruction detected with one or more sensors associated with the autonomous delivery platform 102. Further, in some embodiments, a distress signal may be transmitted to a user via audio or visual alerts, or by wireless communication to a personal electronic device associated with the user. In some embodiments, a distress signal may be transmitted to various components within the system 100. For example, from the autonomous delivery platform 102 to the first multi-use vehicle 106. In other embodiments, the distress signal may be transmitted to one or more devices, such as a logistics or operations server. In some embodiments, the distress signal may be relayed by one or more components. For example, the second multi-use vehicle 104 may retransmit a distress signal received from the first multi-use vehicle 106 to the autonomous delivery platform 102.

In various embodiments, components of the system 100, such as the first multi-use vehicle 106 and the second multi-use vehicle 104, are described as being configured for collaborative real-time adaptive routing. However, it is contemplated that various permutations of the system 100 are also possible. For example, the system 100 may not include a second multi-use vehicle 104. Accordingly, the system 100 may be configured for routing based on environmental data from one or more sensors associated with the components of the system 100, such as the autonomous delivery platform 102 and the first multi-use vehicle 106. Further, it is contemplated that the system 100 further includes additional components, such as a second autonomous delivery platform 102.

Figure 3:
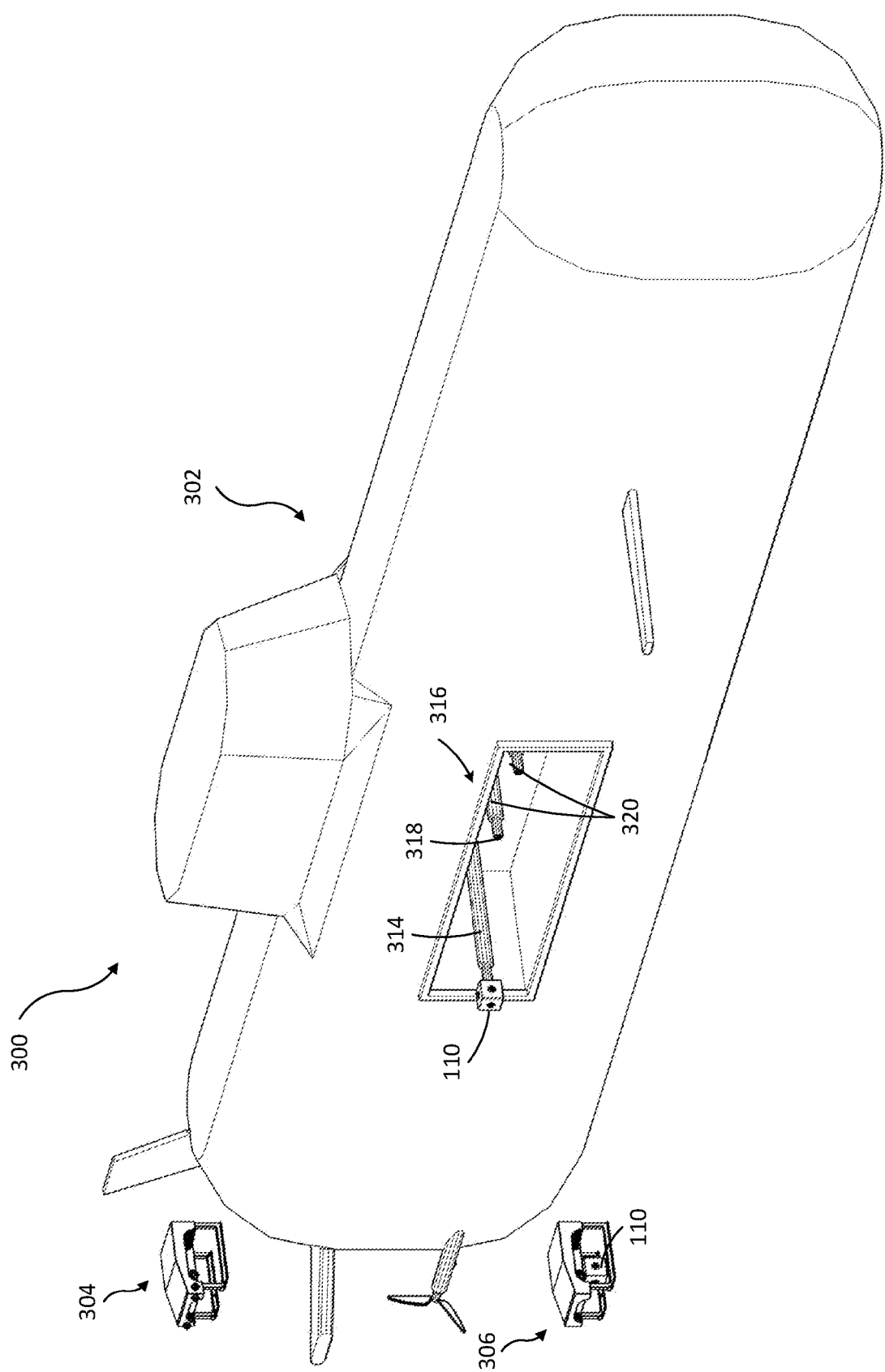
FIG. 3 illustrates a system for package delivery, according to some embodiments.

FIG. 3 illustrates additional embodiments of a system 300 for package delivery. The system 300 includes an autonomous delivery platform 302, a first multi-use vehicle 306, a second multi-use vehicle 304, and a package container reception point (not shown). In the illustrated embodiment, the autonomous delivery platform 302 is a submersible vehicle, but other vehicles may additionally or alternatively be used. The autonomous delivery platform 302 is configured for transporting an object in a package container 110. In some embodiments, package containers 110 may be configured to withstand a plurality of environments or transport conditions. For example, package containers 110 may be waterproof or airtight, or may be configured to maintain a thermo-regulated atmosphere within. The autonomous delivery platform 302 includes a first energy storage device, for example, a battery or fuel tank, retained within the hull of the autonomous delivery platform 302. In some embodiments, the autonomous delivery platform 302 may include more than one energy storage device. Further, routing may be handled by one or more components, or distributed amongst the components. In some embodiments, environmental data may be collected at various sensor associated with components of the system 100, transmitted to an external device or system, such as a via a communication interface, and the routing may then be handled by the external device or system before being communicated back to the system 100. Accordingly, routing between or amongst a plurality of package delivery systems 100 may be improved.

In the illustrated embodiment, the autonomous delivery platform 302 also includes a plurality of mechanical interfaces 316. For example, the mechanical interfaces 316 may be configured as mechanical interchanges, vehicle connection points, and the like, as described in various embodiments herein. In the illustrated embodiment, the delivery platform electromechanical interface 314 is mounted on a distal end of a mechanical package interchange 316 extending from an interior of the autonomous delivery platform 302. The mechanical package interchange 316 is illustrated as an extensible column and is electrically coupled to the first energy storage device. In some embodiments, the mechanical package interchange 316 may alternatively include one or more arms, hydraulic elements, lifts, and the like, configured to facilitate transfer of the package container 110 to or from the autonomous delivery platform 302. Accordingly, objects mated with the delivery platform electromechanical interface 314 may be electrically coupled to one or more systems on the autonomous delivery platform 302, such as the first energy storage device. In some embodiments, the autonomous delivery platform 302 may include various additional attachment points, including respective electromechanical interfaces, such as the second electromechanical interface 318. In the illustrated embodiment, the vehicle attachment points 320 are adjustable columns extending from an inside of the autonomous delivery platform 302. Accordingly, the vehicle attachment points may be extended outwardly to interface with a package container 110, vehicle, or the like, and be retracted during transit of the autonomous delivery platform 302.

Figure 7B:
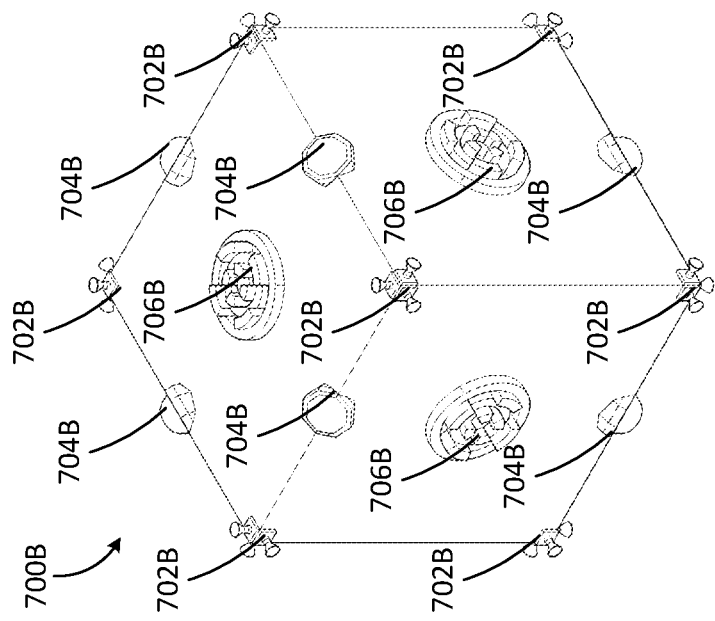
FIG. 7B illustrates a first multi-use vehicle, according to some embodiments.
Figure 7A:
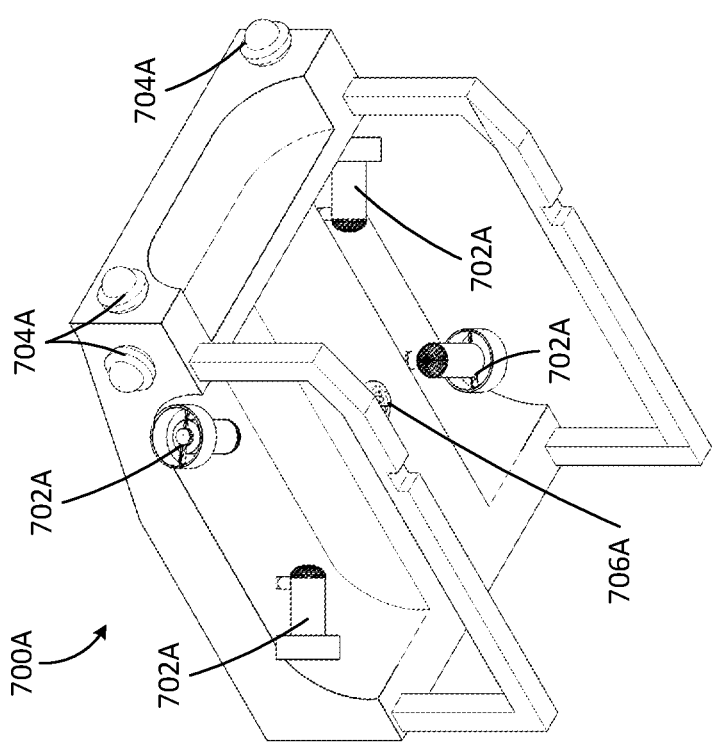
FIG. 7A illustrates a first multi-use vehicle, according to some embodiments.

The second multi-use vehicle 304, also referred to as an unmanned underwater vehicle (UUV), includes a second vehicular electromechanical interface (e.g. 706A of FIG. 7A). In some embodiments, the second vehicular electromechanical interface is configured to releasably couple to the delivery platform electromechanical interface 314, electrically coupling the second multi-use vehicle 304 to the first energy storage device. Accordingly, the second multi-use vehicle 304 may be securely transported on the autonomous delivery platform 302. Further, the second multi-use vehicle 304 may receive power from the first energy storage device, for example, to recharge an onboard battery of the second multi-use vehicle 304. In some embodiments, the second multi-use vehicle 304 may transmit or receive data with the autonomous delivery platform 302 across the delivery platform electromechanical interface. In the illustrated embodiment, the second multi-use vehicle 304 and the first multi-use vehicle 306 are configured as substantially similar vehicles. Accordingly, one or more of the second multi-use vehicle 304 and first multi-use vehicle 306 may be configured to perform either or both roles described. For example, the autonomous delivery platform 302 may be configured to transport a plurality of multi-use vehicles. Accordingly, the vehicles may be deployed according to a situation need. For example, if more navigation support is required, the vehicles may be tasked as second multi-use vehicles 304. Alternatively, if increased package container delivery is required, a portion of the vehicles may be tasked as first multi-use vehicles 306. Accordingly, the second multi-use vehicles 304 and first multi-use vehicles 306 may be configured for collaborative real-time adaptive routing and delivery.

The package container reception point (not shown) includes an anchored electromechanical interface, configured to releasably couple to the package container electromechanical interface 119 of the package container 110. The package container 110 may be secured to an undersea structure, for example, a pylon. Accordingly, a package container 110 coupled to the package container reception point is secured to the structure. In some embodiments, a plurality of package container reception points may be co-located. Accordingly, regional first multi-use vehicles 306 may be assigned to respective package container reception points, and await further delivery instructions. For example, the package container reception point may be in wireless communication with an electronic device and may be configured to release a package container 110 in response to a user identification, an unlock code, or the like. In other embodiments, one or more components may be configured for alternative communication. For example, one or more UUVs may be releasably tethered via a wired communication line, or may communicate with a package container reception point via acoustic transducers.

The first multi-use vehicle 306, illustrated as an unmanned underwater vehicle (UUV), includes a vehicular electromechanical interface (e.g. of FIG. 7A). In some embodiments, the vehicular electromechanical interface is configured for releasably coupling to the package container electromechanical interface 119 of the package container 110. Accordingly, the first multi-use vehicle 306 may transfer or receive package containers 110 from the autonomous delivery platform 302. In further embodiments, the vehicular electromechanical interface may be configured for delivering the package container 110 to the package container reception point. For example, the vehicular electromechanical interface may be configured to only release once positive engagement of the package container 110 with the package container reception point is confirmed. For example, the package container reception point may be configured to transmit electrical power and data via the package container 110 to the first multi-use vehicle 306. Accordingly, the package container reception point, package container 110, and first multi-use vehicle 306 are electrically coupled. In some embodiments, one or more of the first multi-use vehicle 306, package container 110, and package container reception point may record a log of package container transfers.

In some embodiments, the autonomous delivery platform 302, the second multi-use vehicle 304, and the first multi-use vehicle 306 are in wireless communication, for example, over a wireless network. In some embodiments, the first multi-use vehicle 306 may be configured to releasably couple to the vehicle attachments points 320, for example, over the vehicular electromechanical interface. Accordingly, the first multi-use vehicle 306 may additionally be transported by the autonomous delivery platform 302. In some embodiments, the first multi-use vehicle 306 is further configured to receive electrical power and data across the vehicle attachment point 320, for example, from the first energy storage device. In other embodiments, first multi-use vehicles 306 may be assigned a geographic region, such as a coastal shelf, and respond to transmissions from the autonomous delivery platform 302, such as a delivery alert or package container return request.

Figure 4:
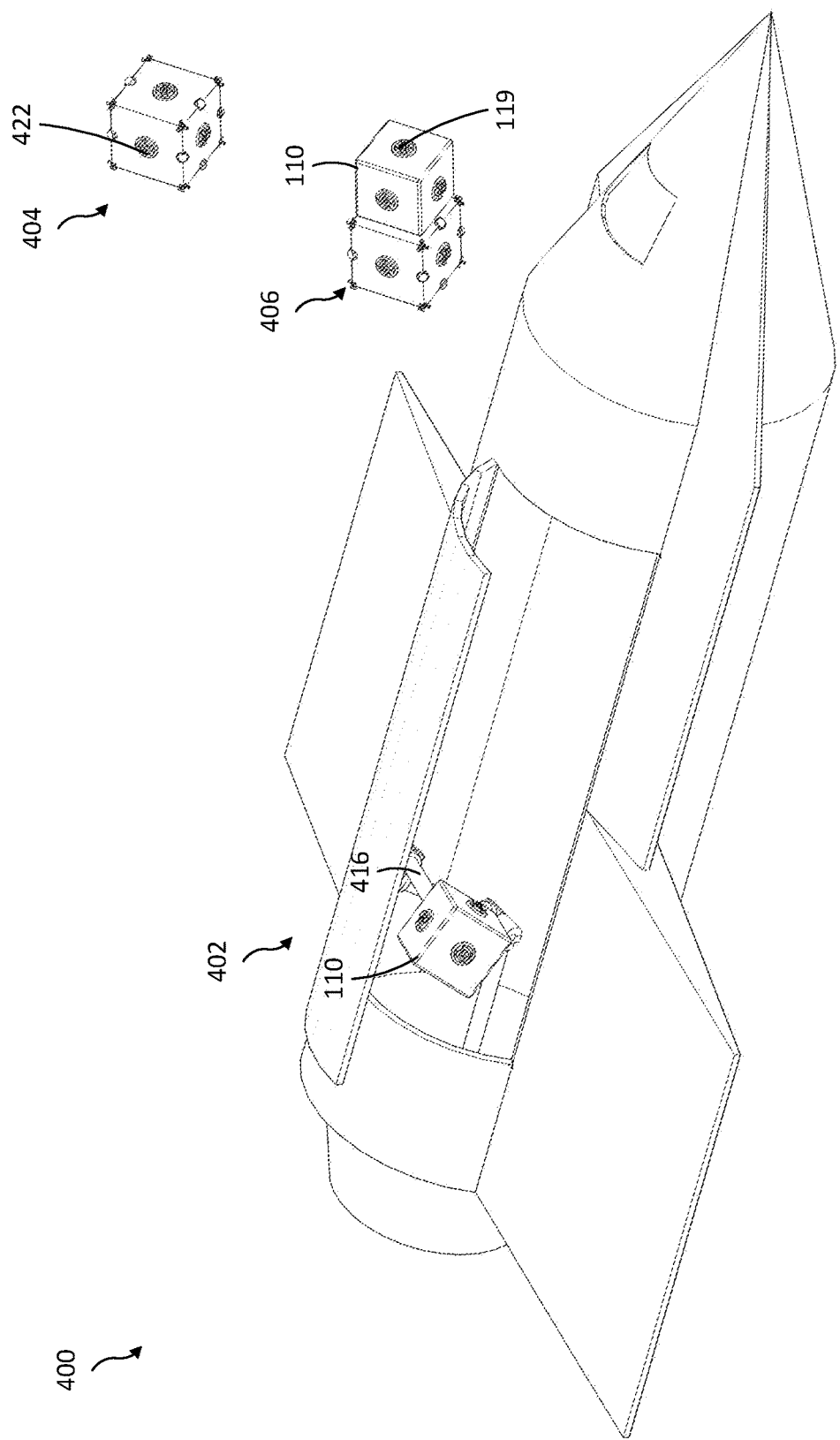
FIG. 4 illustrates a system for package delivery, according to some embodiments.

FIG. 4 illustrates a system 400 for package delivery according to some embodiments. The system 400 includes an autonomous delivery platform 402, a first multi-use vehicle 406, a second multi-use vehicle 404, and a package container reception point (not shown). In the illustrated embodiment, the autonomous delivery platform 402 is a spacecraft, but other vehicles may additionally or alternatively be used. The autonomous delivery platform 402 is configured for transporting an object in a package container 110. In some embodiments, package containers 110 may be configured to withstand a plurality of environments or transport conditions. For example, package containers 110 may be waterproof or airtight, or may be configured to maintain a thermo-regulated atmosphere within. The autonomous delivery platform 402 includes a first energy storage device, for example, a battery or fuel tank, retained within the hull of the autonomous delivery platform 402. In some embodiments, the autonomous delivery platform 402 may include more than one energy storage device.

In the illustrated embodiment, the autonomous delivery platform 402 includes a delivery platform electromechanical interface (not shown) mounted on a distal end of a mechanical package interchange 416 extending from an interior of the autonomous delivery platform 402. The mechanical package interchange 416 is illustrated as a robotic arm and is electrically coupled to the first energy storage device. In the illustrated embodiment, a package container 110 is coupled to the delivery platform electromechanical interface. In some embodiments, the mechanical package interchange 416 may alternatively include one or more arms, hydraulic elements, lifts, and the like, configured to facilitate transfer of the package container 110 to or from the autonomous delivery platform 402. In some embodiments, the autonomous delivery platform 402 may include various additional attachment points, including respective electromechanical interfaces, such as a second electromechanical interface.

The second multi-use vehicle 404, also referred to as a surveying satellite, includes a second vehicular electromechanical interface 422. In some embodiments, the second vehicular electromechanical interface 422 is configured to releasably couple to the delivery platform electromechanical interface, electrically coupling the second multi-use vehicle 404 to the first energy storage device. Accordingly, the second multi-use vehicle 404 may be securely transported on the autonomous delivery platform 402. Further, the second multi-use vehicle 404 may receive power from the first energy storage device, for example, to recharge an onboard battery of the second multi-use vehicle 404. In some embodiments, the second multi-use vehicle 404 may transmit or receive data with the autonomous delivery platform 402 across the delivery platform electromechanical interface. In the illustrated embodiment, the second multi-use vehicle 404 and the first multi-use vehicle 406 are configured as substantially similar vehicles. Accordingly, one or more of the second multi-use vehicle 404 and first multi-use vehicle 406 may be configured for either or both roles described herein. For example, the autonomous delivery platform 402 may be configured to transport a plurality of multi-use vehicles. Accordingly, the vehicles may be deployed according to a situation need. For example, if more navigation support is required, the vehicles may be tasked as second multi-use vehicles 404. Alternatively, if increased package container delivery is required, a portion of the vehicles may be tasked as first multi-use vehicles 406. Accordingly, the second multi-use vehicles 404 and first multi-use vehicles 406 may be configured for collaborative real-time adaptive routing and delivery.

Figure 5:
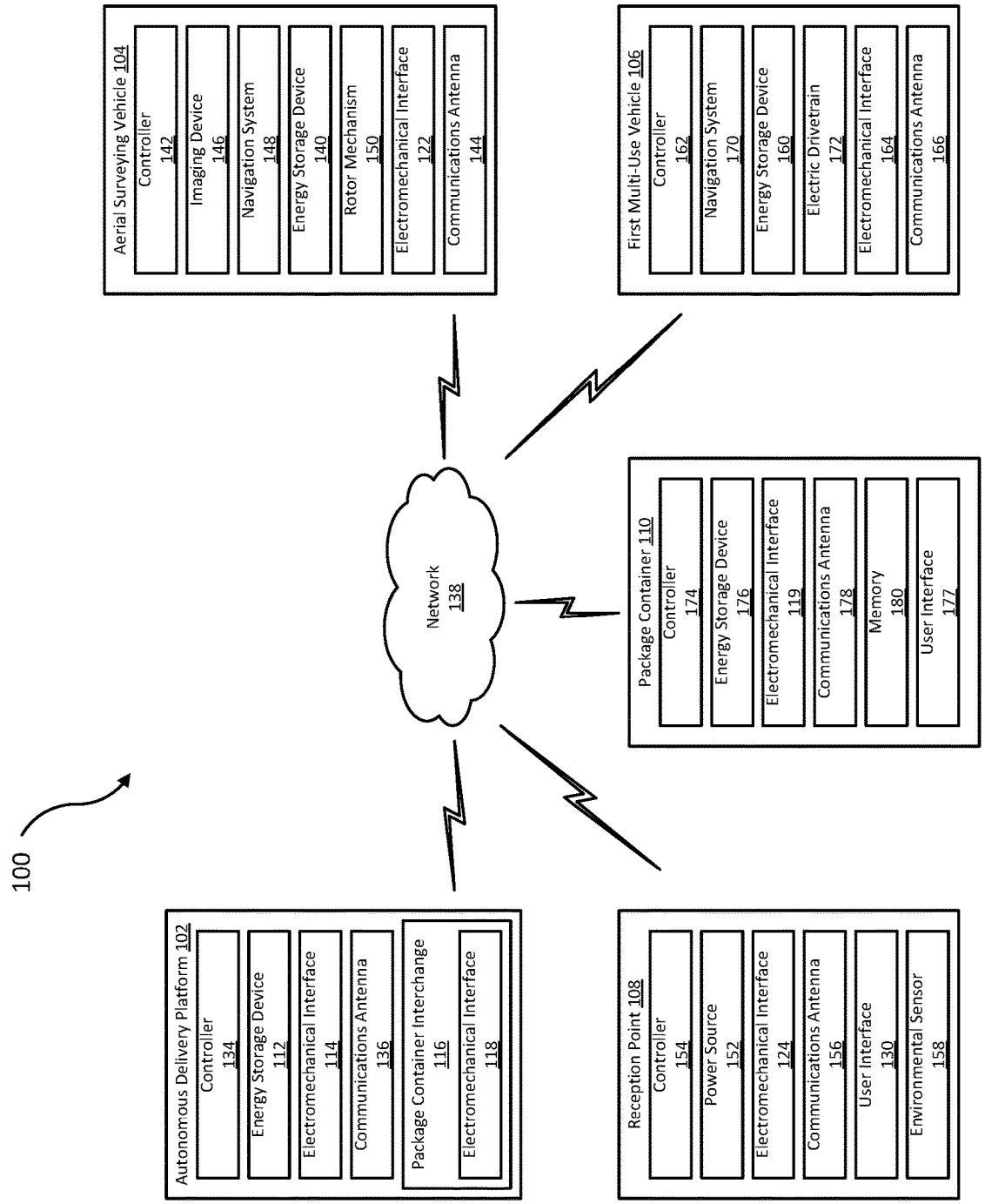
FIG. 5 is a block diagram of a system for package delivery, according to some embodiments.

FIG. 5 illustrates a block diagram of the system 100 for package delivery, according to some embodiments. The system 100 includes an autonomous delivery platform 102, a package container reception point 108, a first multi-use vehicle 106, and a second multi-use vehicle 104. The autonomous delivery platform 102 includes a first energy storage device 112, a controller 134, a delivery platform electromechanical interface 114, a delivery platform communication interface 136, and package container interchange 116. Described variously herein, communication interfaces may be configured for wired or wireless communication. For example, wireless communication via RF transmissions, visible light transmission, acoustic propagation, and the like. The package container interchange further includes a second delivery platform electromechanical interface 118. The controller 134 includes one or more electronic processors or circuitry, such as field-programmable gate arrays (FPGAs) or application-specific integrated circuits (ASICs). The first energy storage device 112 is electrically coupled to the controller 134, both of which are electrically coupled to the delivery platform electromechanical interface 114 and the package container interchange 116. Accordingly, the controller 134 and first energy storage device 112 may be operable to transmit and receive electrical power and data across one or more of the first and the second electromechanical interfaces 114, 118. Further, the controller 134 is coupled to the delivery platform communication interface 136. Accordingly, the autonomous delivery platform 102 may be configured to wirelessly communicate directly or indirectly with the second multi-use vehicle 104, the package container reception point 108, and the first multi-use vehicle 106, for example, over a wireless network 138 (e.g. Wi-Fi, Bluetooth, Z-wave, etc.). In some embodiments, the wireless network 138 is configured as a mesh network. Accordingly, wireless transmissions may be relayed or bridged between various devices and vehicles.

The second multi-use vehicle 104 includes a second energy storage device 140, a controller 142, a second vehicular electromechanical interface 122, a second vehicle communication interface 144, an imaging device 146, a navigation system 148, and a rotor mechanism 150, such as a ducted fan driven by an electric motor. The controller 142 includes one or more electronic processors or circuitry, such as field-programmable gate arrays (FPGAs) or application-specific integrated circuits (ASICs). The second energy storage device 140 is electrically coupled to the controller 142, both of which are electrically coupled to the second vehicular electromechanical interface 122, and the rotor mechanism 150. Accordingly, flight and movement of the second multi-use vehicle 104 may be controlled by the controller 142. The controller 142 is further coupled to the navigation system 148, such as one or more of a GPS and magnetometer, and the imaging device 146, such as a camera, Far Infrared sensor, or LIDAR sensor. Further, the second multi-use vehicle 104 may include additional sensors, such as environmental sensors. The controller 142 is also coupled to the second vehicle communication interface 144. Accordingly, the second multi-use vehicle 104 may be configured to wirelessly communicate directly or indirectly with the autonomous delivery platform 102, the package container reception point 108, and the first multi-use vehicle 106, for example, over the wireless network 138.

In some embodiments, the package container reception point 108 includes a power source 152, a controller 154, an anchored electromechanical interface 124, a reception point communication interface 156, an environmental sensor 158, and a user interface 130, such as a keypad or touchscreen. Alternatively, or in addition, the package container 110 may include one or more user interfaces, such as user interface 130. The controller 154 includes one or more electronic processors or circuitry, such as field-programmable gate arrays (FPGAs) or application-specific integrated circuits (ASICs). The power source 152, such as in internal energy storage device or conventional AC or DC power supply, is electrically coupled to the controller 154, both of which are electrically coupled to the anchored electromechanical interface 124. Additionally, the controller 154 is coupled to the reception point communication interface 156, the environmental sensor 158, and the user interface 130. Accordingly, a package container 110 may be securely received at the anchored electromechanical interface 124 and released in response to an input at the user interface 130. In some embodiments, the controller 154 may control the electromechanical interface 124 to release in response to a signal from a device over the wireless network 138. In some embodiments, the package container reception point 108 may include one or more imaging devices, such as cameras. Accordingly, a package container 110 may be released in response to a visual identification of a user associated with the package container 110. Further, in some embodiments, the controller 154 may transmit environmental data via the reception point communication interface 156 to one or more autonomous delivery platforms 102. Accordingly, delivery hazards may be, at least in part, avoided and last-mile delivery may be improved.

In some embodiments, the first multi-use vehicle 106 includes a fourth energy storage device 160, a controller 162, a vehicular electromechanical interface 164, a first vehicle communication interface 166, an imaging device 168, a navigation system 170, and an electric drivetrain 172, such as wheels driven by one or more electric motors. The controller 162 includes one or more electronic processors or circuitry, such as field-programmable gate arrays (FPGAs) or application-specific integrated circuits (ASICs). The fourth energy storage device 160 is electrically coupled to the controller, both of which are electrically coupled to the vehicular electromechanical interface 164, and the electric drivetrain 172. Accordingly, steering and velocity of the first multi-use vehicle 106 may be controlled by the controller 162. The controller 162 is further coupled to the navigation system 170, such as one or more of a GPS and magnetometer. Accordingly, the first multi-use vehicle 106 may accurately navigate a delivery route. In some embodiments, the first multi-use vehicle may include one or more imaging devices 168, such as a camera, Far Infrared sensor, or LIDAR sensor, coupled to the controller 162. Further, the first multi-use vehicle 106 may include additional sensors, such as environmental sensors. The controller is also coupled to the first vehicle communication interface 166. Accordingly, the first multi-use vehicle 106 may be configured to wirelessly communicate directly or indirectly with the autonomous delivery platform 102, the package container reception point 108, and the second multi-use vehicle 104, for example, over the wireless network 138. Further, the first multi-use vehicle 106 may be configured for collaborative real-time adaptive routing, for example, with the second multi-use vehicle 104 via the wireless network 138. In some embodiments, the controller 162 may be configured to detect a state of impairment or duress of the first multi-use vehicle 106. In some embodiments, the controller 162 may further be configured to transmit a distress signal via the first vehicle communication interface 166.

In some embodiments, a package container 110 is configured with a controller 174, energy storage device 176, a user interface 177, package container electromechanical interface 119, container communication interface 178, and memory 180. The controller 174 includes one or more electronic processors or circuitry, such as field-programmable gate arrays (FPGAs) or application-specific integrated circuits (ASICs). The energy storage device 176 is electrically coupled to the controller 174, both of which are electrically coupled to the package container electromechanical interface 119. In some embodiments, a package container 110 may contain a plurality of electromechanical interfaces 119, for example, one package container electromechanical interface 119 per side of the package container 110. The controller 174 is further coupled to the container communication interface 178. In some embodiments, the package container 110 may be configured to wirelessly communicate directly or indirectly with the autonomous delivery platform 102, the second multi-use vehicle 104, the package container reception point 108, and the first multi-use vehicle 106, for example, over the wireless network 138. In other embodiments, the package container 110 includes more elements. For example, a thermo-regulating device, such as an electric heater or heat pipe. In some embodiments, a package container 110 may include fewer elements, such as only including a package container electromechanical interface 119. In some embodiments, the package container 110 includes a plurality of electromechanical interfaces 119 which are electrically coupled to each other. Accordingly, power and data may be transmitted through the package container 110, for example, between the first multi-use vehicle 106 and the package container reception point 108. In some embodiments, the package container 110 may be configured to record a log of transfers, for example, in memory 180. In some embodiments, one or more components may be configured to only receive log data across a wired connection, such as via an electromechanical interface. Accordingly, additional security may be enabled. For example, the package container 110 may record a time, location, and identifier of the autonomous delivery platform 102 and first multi-use vehicle 106 when offloaded. Subsequently, the package container 110 may record a time, location, and identifier of the first multi-use vehicle 106 and the package container reception point 108 when delivery is completed. In some embodiments, an image or video of an initial pickup or final delivery may be recorded, for example, with an imaging sensor associated with one or more of the package container reception point 108 and the first multi-use vehicle 106. For example, a first video record of a final delivery may be recorded with an imaging sensor associated with the package container reception point 108 while a second video record of the final delivery is recorded with an imaging sensor associated with the first multi-use vehicle 106. Accordingly, the first and second video records may be compared and provide confirmation of the final delivery. In some embodiments, a record of transfers may be recorded in a memory associated with the autonomous delivery platform 102, for example, an onboard memory coupled to the controller 134, or a server in communication with the network 138. Accordingly, congruent logs or ledgers of package container transfer(s) may be maintained on disparate systems, for example, to enable secure chain-of-custody delivery.

FIGS. 6A and 6B illustrate upper and lower perspective views of a second multi-use vehicle 104, according to some embodiments. Accordingly, similar elements have been respectively numerated. The second multi-use vehicle 104 includes a housing 600 which retains the navigation system 148, the second energy storage device 140, such as a battery, and the second vehicle communication interface 144. An electromechanical interface 122 is coupled to an underside of the housing 600. In some embodiments, a rotor mechanism 150 powered by the energy storage device 140 and operable to spin the rotors 602. In some embodiments, the rotor mechanism 150 is operable to enable sustained flight of the second multi-use vehicle 104. In some embodiments, the energy storage device 140 and rotor mechanism 150 may be configured to enable sustained flight of the second multi-use vehicle 104 and one of the package container 110 or the first multi-use vehicle 106. For example, in some embodiments, the second multi-use vehicle 104 may be configured as a supplementary delivery vehicle. In some embodiments, the second multi-use vehicle 104 may be configured to retrieve or assist a first multi-use vehicle 106. In some embodiments, the electromechanical interface 122 is configured to releasably couple to the autonomous delivery platform 102. In the illustrated embodiment, the second multi-use vehicle 104 includes four imaging devices 146 mounted on the underside of housing 600. Accordingly, the second multi-use vehicle 104 may be configured to monitor a complete field of view. In some embodiments, the second multi-use vehicle 104 may have more or fewer imaging devices 146, or the imaging devices 146 may be located on a top or side of the housing. In some embodiments, the second multi-use vehicle 104 may monitor a package container destination, for example, a package container reception point 108. Accordingly, a video recording of the delivery may be included in one or more of the recorded transfer logs. In some embodiments, the second multi-use vehicle 104 may be configured to monitor a package container destination, for example, a user associated with the package container reception point 108. Accordingly, the second multi-use vehicle 104 may enable facial recognition and authentication of the user to be performed. For example, a user may be identified and authorized, an updated route to the user may be sent to the first multi-use vehicle 106, and release instructions may be sent to the first multi-use vehicle 106. Accordingly, secure chain-of-custody delivery may be preserved without delivering to a package container reception point 108.

FIGS. 7A and 7B illustrate multi-use vehicles, according to some embodiments. The multi-use vehicle of FIG. 7A is a UUV 700A and may be purposed as a second multi-use vehicle 304 and/or a first multi-use vehicle 306. In the illustrated embodiment, the UUV 700A includes four positionable rotor mechanisms 702A in communication with the controller of the UUV 700A. Accordingly, undersea travel may be controlled by the controller. The UUV 700A further includes four imaging devices 704A (three shown), enabling a panoramic view of the environment. The UUV 700A further includes an electromechanical interface 706A. In some embodiments, the UUV 700A may further include one or more illumination devices. Accordingly, the UUV 700A may be configured for transport on an autonomous delivery platform 302 by coupling the electromechanical interface 706A to an electromechanical interface of the autonomous delivery platform 302. Additionally, or alternatively, the UUV 700A may couple to a package container 110 and transport the package container 110 to an undersea package container reception point.

FIG. 7B illustrates a multi-use vehicle, according to some embodiments. The multi-use vehicle is a cubically symmetric cargo satellite 700B and may be purposed as a surveying vehicle 404 and/or a first multi-use vehicle 406. In the illustrated embodiment, the cargo satellite 700B includes eight thruster assemblies 702B positioned at respective corners of the cargo satellite 700B. The thruster assemblies 702B are fueled by an energy storage device within the cargo satellite 700B. Accordingly, movement and positioning of the cargo satellite 700B in micro-gravity may be controlled by a controller of the cargo satellite 700B. In some embodiments, the cargo satellite 700B may include one or more reaction wheels coupled to respective rotor mechanisms, for example, to orient the cargo satellite 700B without releasing fuel. In the illustrated embodiment, the cargo satellite 700B includes eight imaging devices 704B secured along eight edges of the cargo satellite 700B. Accordingly, a comprehensive view of the environment of the cargo satellite 700B may be achieved. In the illustrated embodiment, the cargo satellite 700B includes an electromechanical interface 706B on each of the faces. Accordingly, repositioning of the cargo satellite 700B may be reduced.

FIG. 8 illustrates a first multi-use vehicle 106 and package container reception point 108, according to some embodiments. The first multi-use vehicle 106 includes a vehicular electromechanical interface 164 on a top side of the first multi-use vehicle 106. In some embodiments, the first multi-use vehicle 106 may include additional electromechanical interfaces, for example, on the top or bottom sides. In some embodiments, the package container 110 may include more or fewer electromechanical interfaces. In some embodiments, the electromechanical interfaces 119 include a plurality of axially symmetric collars 182A-182D. In some embodiments, the electromechanical interfaces 119 include one or more stationary collars 182A and one or more rotary collars 182C. In further embodiments, one or more of the rotary collars 182C may be configured to lock or latch, for example, in a closed or coupled position. In some embodiments, the package container electromechanical interface 119 includes an electrical interface. In some embodiments, the electrical interface includes a plurality of electrical terminals, such as protrusions or recesses. In some embodiments, the package container electromechanical interface 119 may include a plurality of substantially similar electrical interfaces, for example, circumferentially spaced about one or more collars. Accordingly, in some embodiments, the package container electromechanical interface 119 may be configured as a hermaphroditic connector. That is to say, the package container electromechanical interface 119 may be configured for coupling between any other electromechanical interfaces 114, 118, 119, 122, 124, 164, and the like. Accordingly, the package container electromechanical interface 119 may be considered a "universal" connector.

In the illustrated embodiment, the first multi-use vehicle 106, supportably coupled to the package container 110, approaches the package container reception point 108. In some embodiments, the first multi-use vehicle 106 may be in wireless communication with the package container reception point 108. In some embodiments, the first multi-use vehicle 106 and package container reception point 108 may only be configured for wired communication. In some embodiments, the first multi-use vehicle 106 aligns itself with support forks 128 mounted below the electromechanical interface 124 of the package container reception point 108, and approaches the package container reception point 108. In other embodiments, other static or dynamic mechanical interchanges, such as lifts, arms, levers, or rollers, may substitute or supplement the support forks 128. Accordingly, the package container 110 is aligned with the electromechanical interface 124 of the package container reception point 108. The rotatable collars 182C of the hermaphroditic elements lock to each other, locking the package container 110 to the package container reception point 108 and, by extension, electrically coupling the first multi-use vehicle 106 to the package container reception point 108. Accordingly, electrical power and data, such as transfer information, may be securely transmitted via the package container 110. Accordingly, in some embodiments, the first multi-use vehicle 106 remains secured to the package container 110 until the package container reception point 108 confirms secure delivery of the package container 110. In some embodiments, the first multi-use vehicle 106 may remain coupled to the package container reception point 108 via the package container 110. For example, in the case that the first multi-use vehicle 106 is a neighborhood first multi-use vehicle 106. Or, for example, in the case that the energy storage device of the first multi-use vehicle 106 is not at full capacity.

Figure 9:
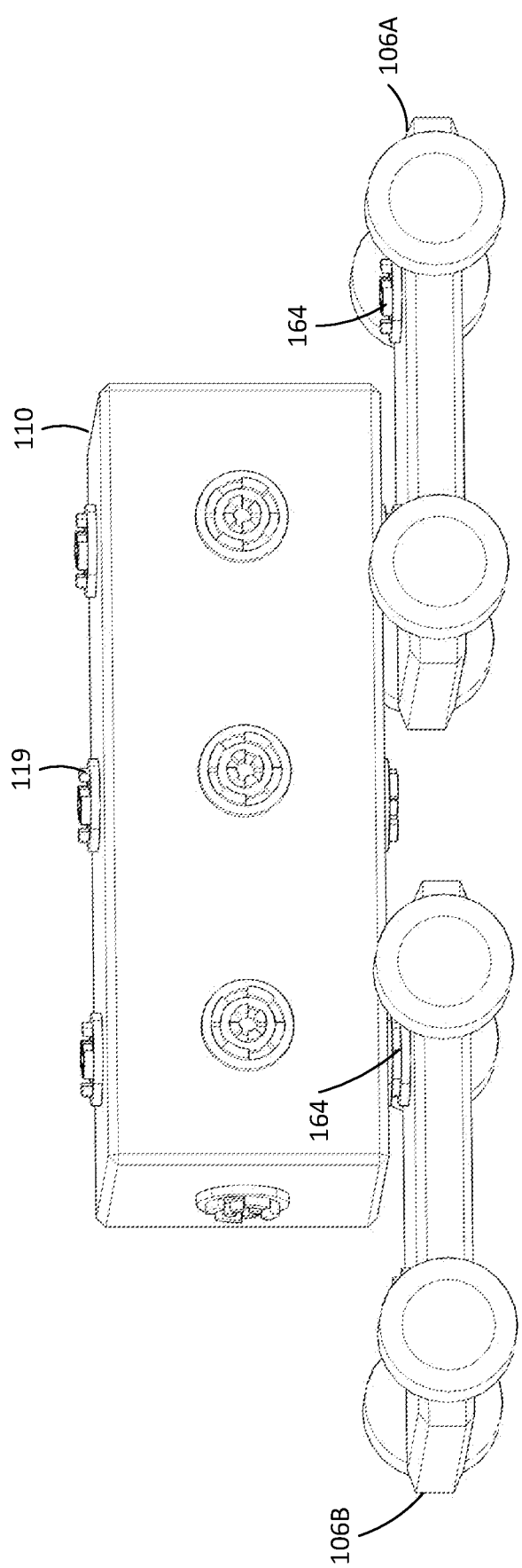
FIG. 9 illustrates a system for package delivery, according to some embodiments.

FIG. 9 illustrates collaborate package delivery between two first multi-use vehicles 106A and 106B, according to some embodiments. In the illustrated embodiment, each first multi-use vehicle 106A, B includes two electromechanical connectors 164. Accordingly, in the case that a package container 110 is overly long or heavy, a plurality of first multi-use vehicles 106 may collaborate to deliver the package container 110. Further, in some embodiments, package containers 110 may comprise a nested container array. For example, in the case that a single user is associated with a plurality of package containers 110, the plurality of package containers 110 may be secured within a nesting or parent package container. Accordingly, a plurality of package containers 110 may be secured, via the parent package container, to a single package container reception point 108. Further, a plurality of first multi-use vehicles 106 may be configured to transport the parent package container. In one embodiment, the parent package container may be formed by coupling a plurality of package containers 110 to each other. In some embodiments, a plurality of first multi-use vehicles 106 may transport a plurality of package containers 110, associated with geographically proximate users, in a single parent package container. For example, a pair of neighborhood first multi-use vehicles 106 may transport a parent package container to a location adjacent an autonomous delivery platform 102. The mechanical package interchange transfers package containers 110 associated with neighborhood users into the parent package container, where they are securely coupled. The first multi-use vehicles 106 may then convey the parent package container to a package container reception point 108. Alternatively, the first multi-use vehicles 106 may transport the parent package container to respective user locations, identify and authenticate the user with one or more imaging devices 168, and release the respective package container into custody of the user.

Figure 10:
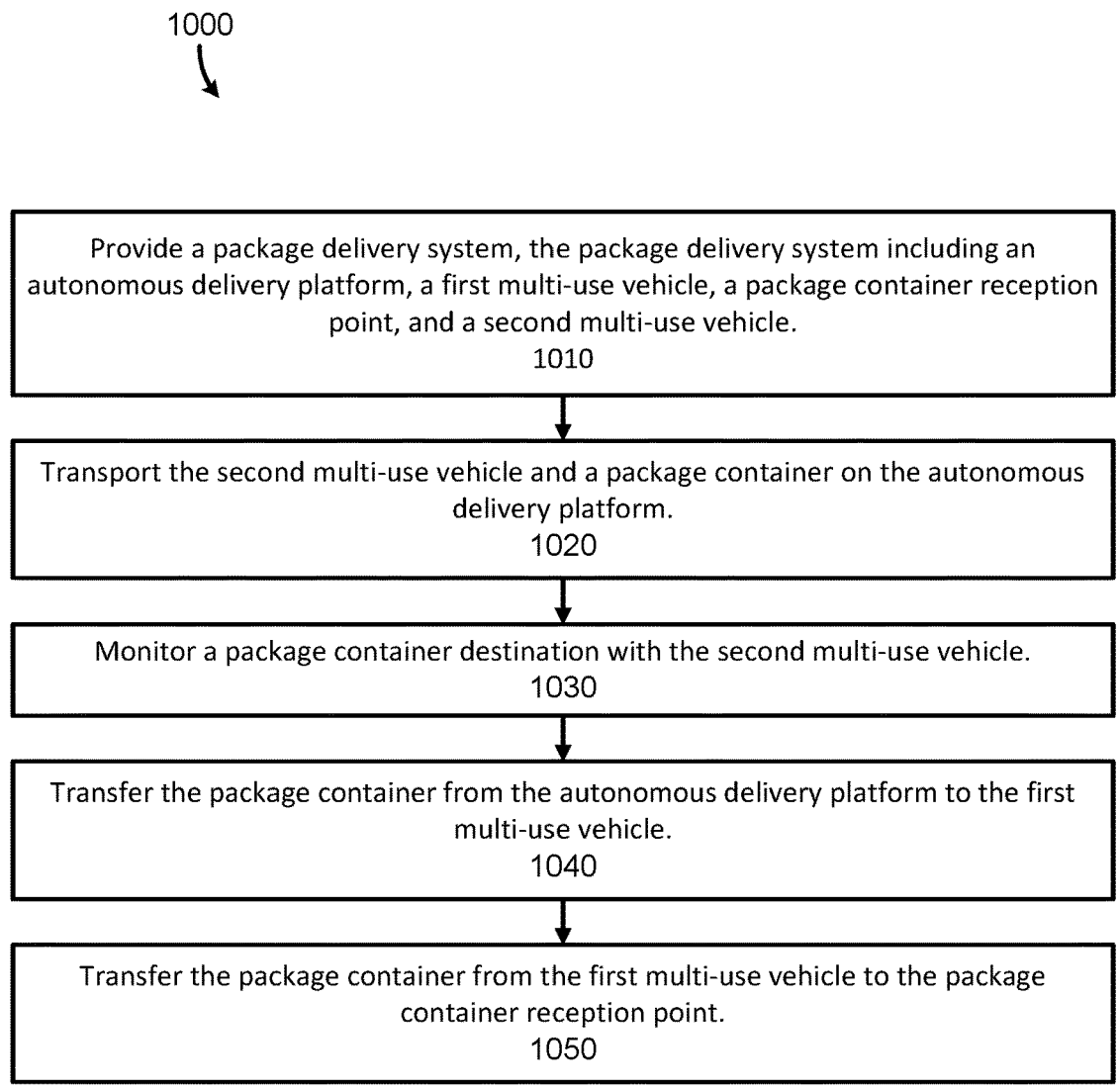
FIG. 10 is a flow diagram of a method for package delivery, according to some embodiments.

FIG. 10 is a flow diagram of a method 1000 of package delivery, according to some embodiments. At step 1010, a package delivery system is provided, which includes an autonomous delivery platform, a second multi-use vehicle, a package container reception point, and a first multi-use vehicle. At step 1020, the second multi-use vehicle and a package container are transported on the autonomous delivery platform. For example, the second multi-use vehicle may be coupled to the autonomous delivery platform while during a first portion of a last-mile delivery and deployed during a second portion of a last-mile delivery. At step 1030, a package container destination is monitored with the second multi-use vehicle. In some embodiments, the monitoring may include deploying the second multi-use vehicle. At step 1040, the package container is transferred from the autonomous delivery platform to the first multi-use vehicle. For example, the package container may be transferred via a mechanical interchange. Further, in some embodiments, the package container may be secured to the first multi-use vehicle via a pair of electromechanical interfaces. At step 1050, the package container is transferred from the first multi-use vehicle to the package container reception point.

Figure 11:
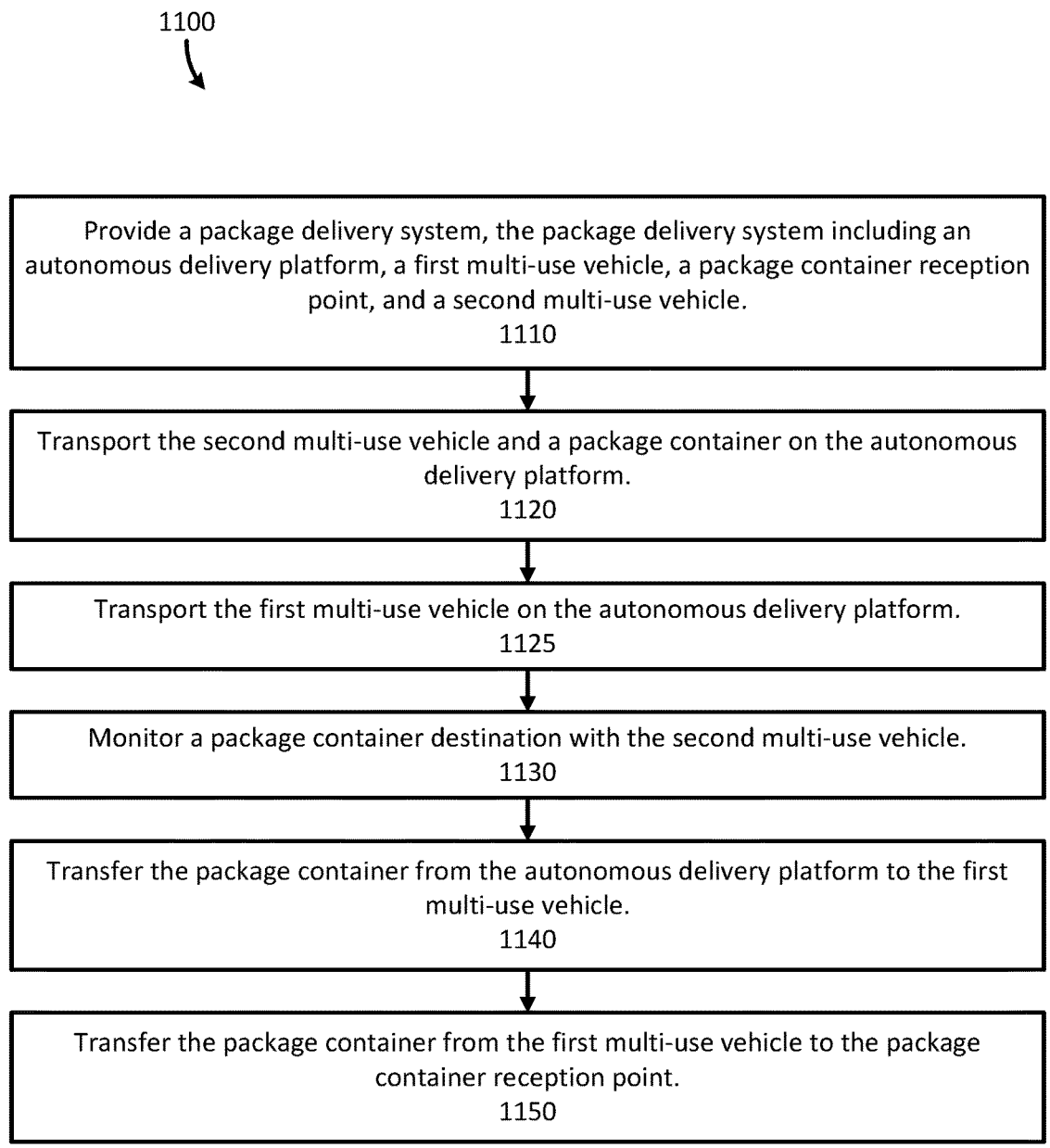
FIG. 11 is a flow diagram of a method for package delivery, according to some embodiments.

FIG. 11 is a flow diagram of a method 1100 of package delivery, according to some embodiments. At step 1110, a package delivery system is provided, which includes an autonomous delivery platform, a second multi-use vehicle, a package container reception point, and a first multi-use vehicle. At step 1120, the second multi-use vehicle and a package container are transported on the autonomous delivery platform. At step 1125, the first multi-use vehicle is additionally transported on the autonomous delivery platform. For example, the first multi-use vehicle may be coupled to the autonomous delivery platform while during a first portion of a last-mile delivery and deployed during a second portion of a last-mile delivery. At step 1130, a package container destination is monitored with the second multi-use vehicle. In some embodiments, the monitoring may include deploying the second multi-use vehicle. At step 1140, the package container is transferred from the autonomous delivery platform to the first multi-use vehicle. For example, the package container may be transferred via a mechanical interchange. Further, in some embodiments, the package container may be secured to the first multi-use vehicle via a pair of electromechanical interfaces. At step 1150, the package container is transferred from the first multi-use vehicle to the package container reception point. In some embodiments, the package container remains at the package container reception point after a delivery. For example, the package container may be transferred from the first multi-use vehicle to the package container reception point. A user may then be authorized, such as by inputting a security code into a user interface of the package container, package container reception point, or a personal electronic device in wireless communication with either or both of the package container and package container reception point. The package container may then permit the user to access the transport space within the package container, without disconnecting from the package container reception point. After the transport space has been emptied by the user, the package container may transmit a pickup request, for example, to an autonomous delivery platform or a central logistic server in communication with a system for package delivery. Accordingly, in some embodiments, the package container may be secured along a complete delivery and pickup transit circuit.

Figure 12:
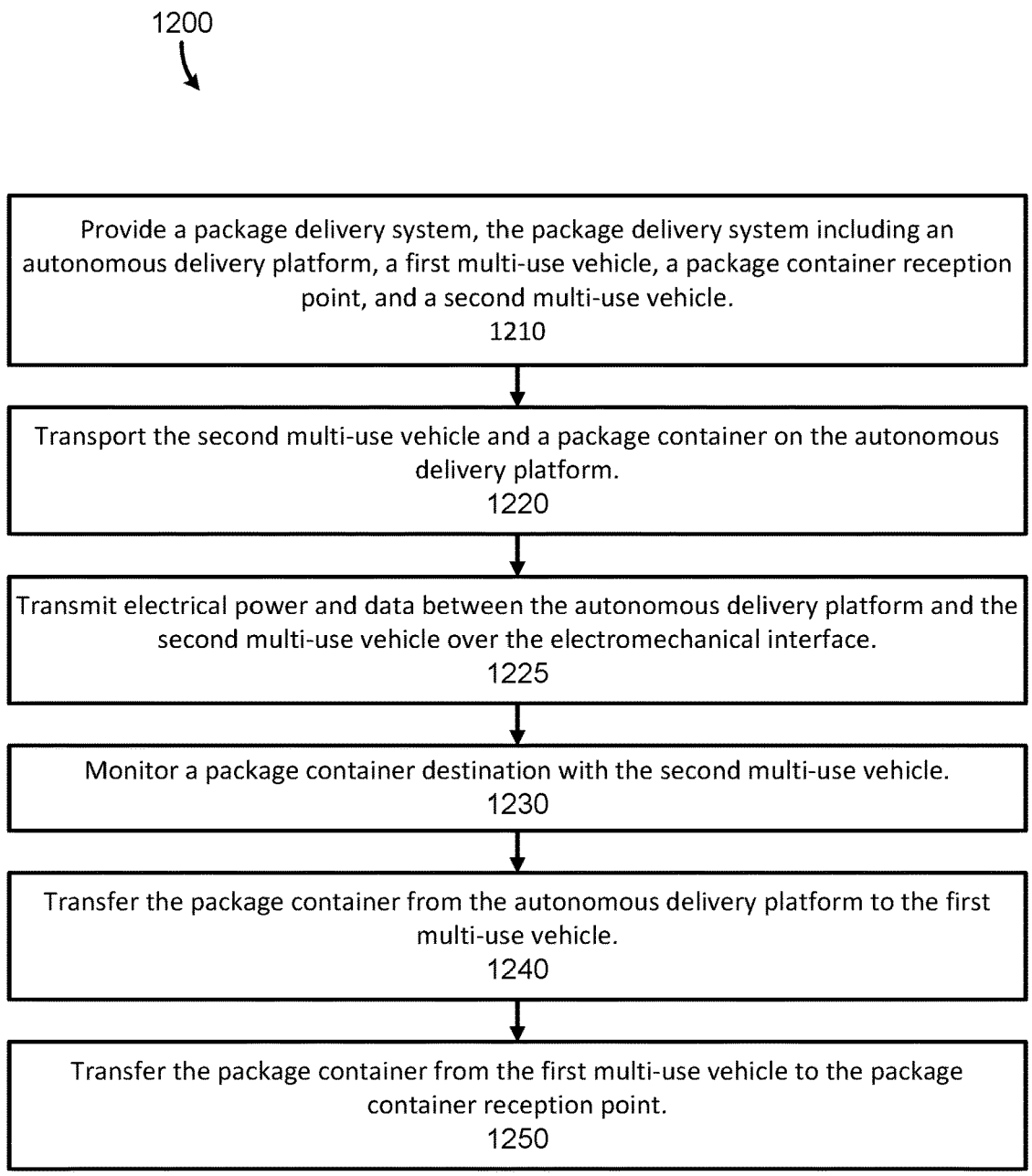
FIG. 12 is a flow diagram of a method for package delivery, according to some embodiments.

FIG. 12 is a flow diagram of a method 1200 of package delivery, according to some embodiments. At step 1210, a package delivery system is provided, which includes an autonomous delivery platform, a second multi-use vehicle, a package container reception point, and a first multi-use vehicle. At step 1220, the second multi-use vehicle and a package container are transported on the autonomous delivery platform. For example, the second multi-use vehicle may be coupled to the autonomous delivery platform while during a first portion of a last-mile delivery and deployed during a second portion of a last-mile delivery. At step 1225, electrical power and data is transmitted between the autonomous delivery platform and the second multi-use vehicle over the electromechanical interface. For example, the autonomous delivery vehicle may recharge the second multi-use vehicle. Alternatively, or in addition, the second multi-use vehicle may transfer data, for example, a video recording of a delivery. At step 1230, a package container destination is monitored with the second multi-use vehicle. In some embodiments, the monitoring may include deploying the second multi-use vehicle. At step 1240, the package container is transferred from the autonomous delivery platform to the first multi-use vehicle. For example, the package container may be transferred via a mechanical interchange. Further, in some embodiments, the package container may be secured to the first multi-use vehicle via a pair of electromechanical interfaces. At step 1250, the package container is transferred from the first multi-use vehicle to the package container reception point.

Figure 13:
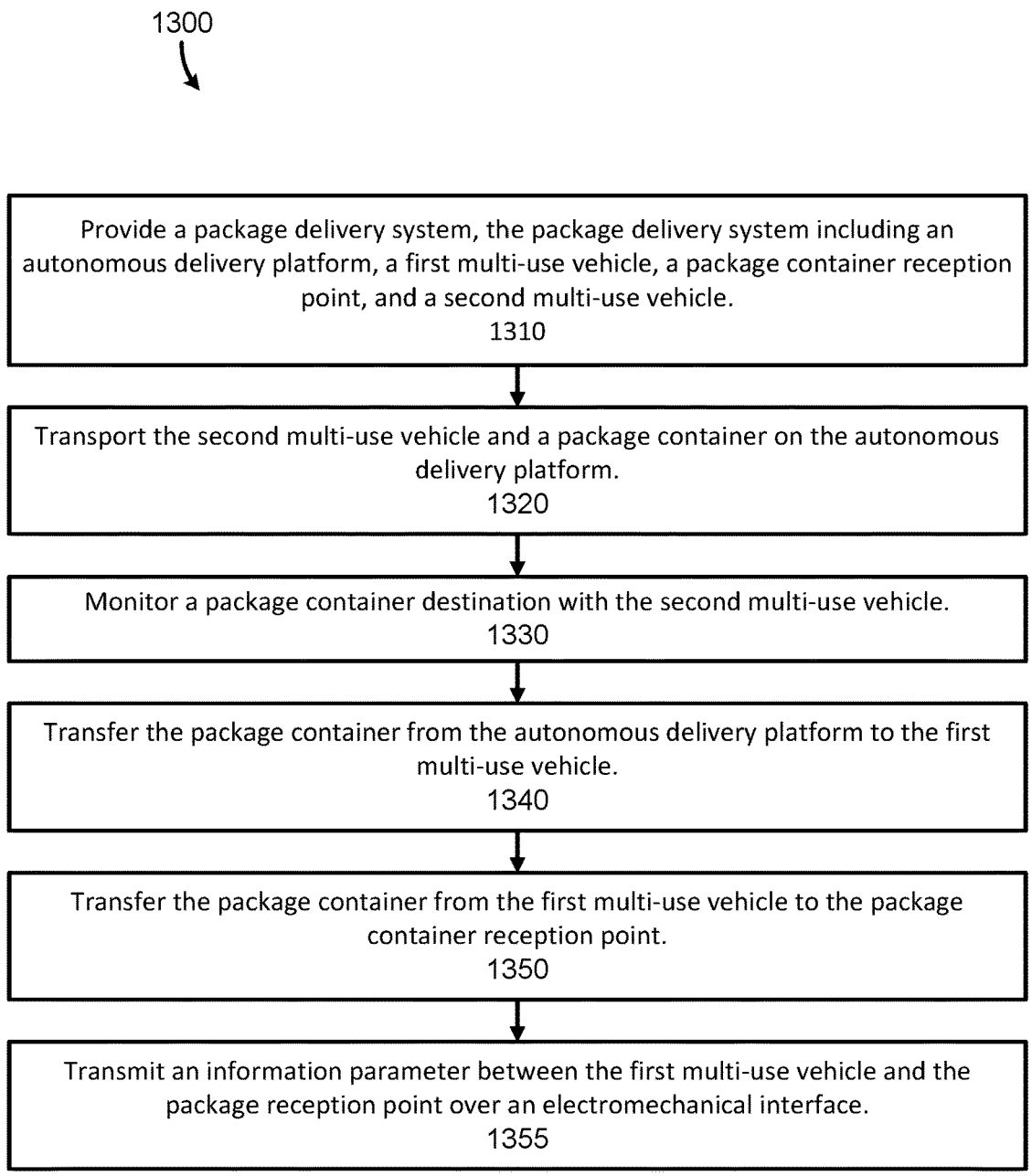
FIG. 13 is a flow diagram of a method for package delivery, according to some embodiments.

FIG. 13 is a flow diagram of a method 1300 of package delivery, according to some embodiments. At step 1310, a package delivery system is provided, which includes an autonomous delivery platform, a second multi-use vehicle, a package container reception point, and a first multi-use vehicle. At step 1320, the second multi-use vehicle and a package container are transported on the autonomous delivery platform. For example, the second multi-use vehicle may be coupled to the autonomous delivery platform while during a first portion of a last-mile delivery and deployed during a second portion of a last-mile delivery. At step 1330, a package container destination is monitored with the second multi-use vehicle. In some embodiments, the monitoring may include deploying the second multi-use vehicle. At step 1340, the package container is transferred from the autonomous delivery platform to the first multi-use vehicle. For example, the package container may be transferred via a mechanical interchange. Further, in some embodiments, the package container may be secured to the first multi-use vehicle via a pair of electromechanical interfaces. At step 1350, the package container is transferred from the first multi-use vehicle to the package container reception point. At step 1355, an information parameter is transferred between the first multi-use vehicle and the package container reception point over an electromechanical interface. For example, the package container may confirm secure delivery of the package container with the package container reception point via an electromechanical interface of the package container.

Figure 14:
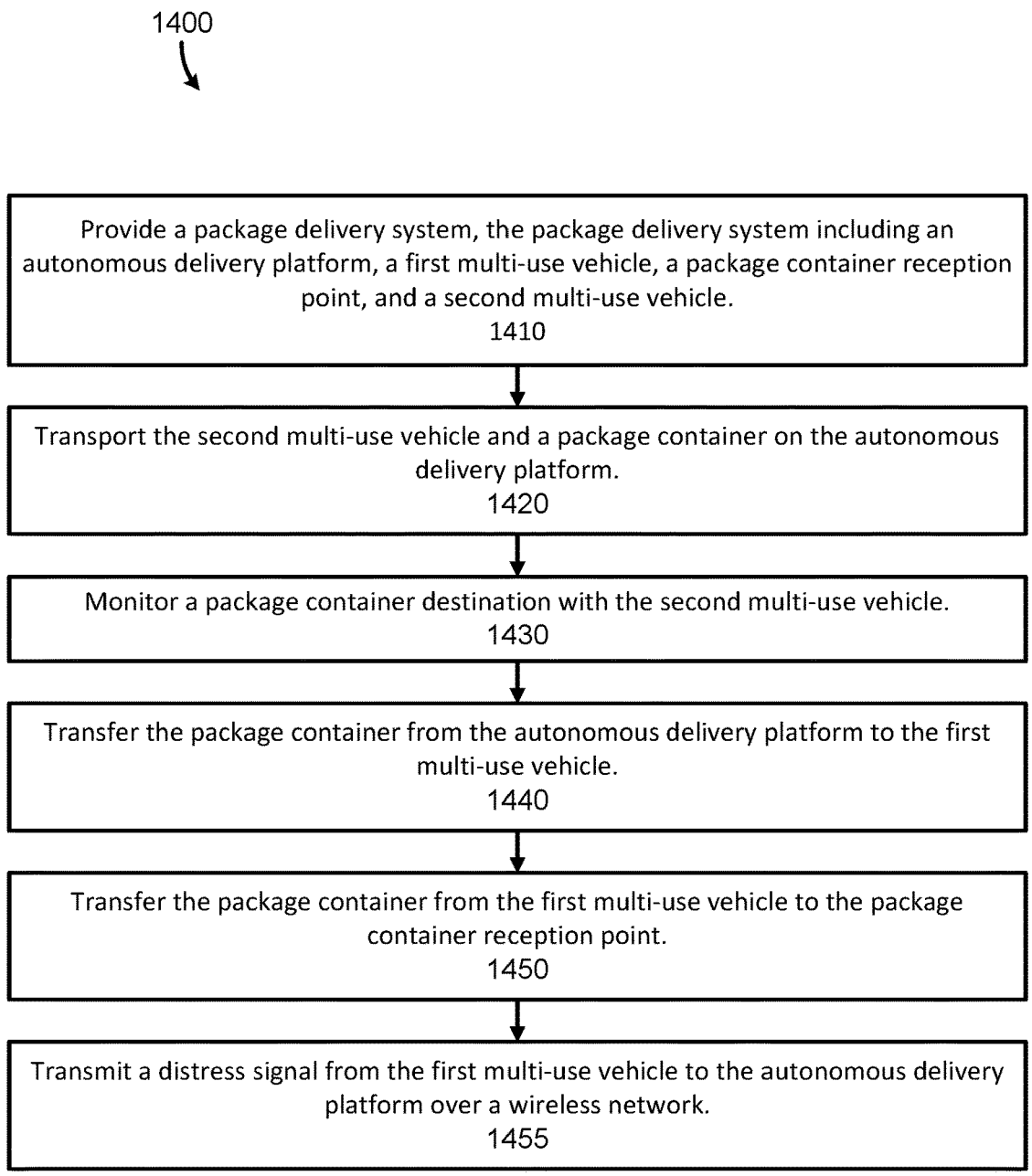
FIG. 14 is a flow diagram of a method for package delivery, according to some embodiments.

FIG. 14 is a flow diagram of a method 1400 of package delivery, according to some embodiments. At step 1410, a package delivery system is provided, which includes an autonomous delivery platform, a second multi-use vehicle, a package container reception point, and a first multi-use vehicle. At step 1420, the second multi-use vehicle and a package container are transported on the autonomous delivery platform. For example, the second multi-use vehicle may be coupled to the autonomous delivery platform while during a first portion of a last-mile delivery and deployed during a second portion of a last-mile delivery. At step 1430, a package container destination is monitored with the second multi-use vehicle. In some embodiments, the monitoring may include deploying the second multi-use vehicle. At step 1440, the package container is transferred from the autonomous delivery platform to the first multi-use vehicle. For example, the package container may be transferred via a mechanical interchange. Further, in some embodiments, the package container may be secured to the first multi-use vehicle via a pair of electromechanical interfaces. At step 1450, the package container is transferred from the first multi-use vehicle to the package container reception point. At step 1455, a distress signal is transmitted from the first multi-use vehicle to the autonomous delivery platform over a wireless network. For example, the first multi-use vehicle may transmit a distress signal that the package container reception point is malfunctioning.

Figure 15:
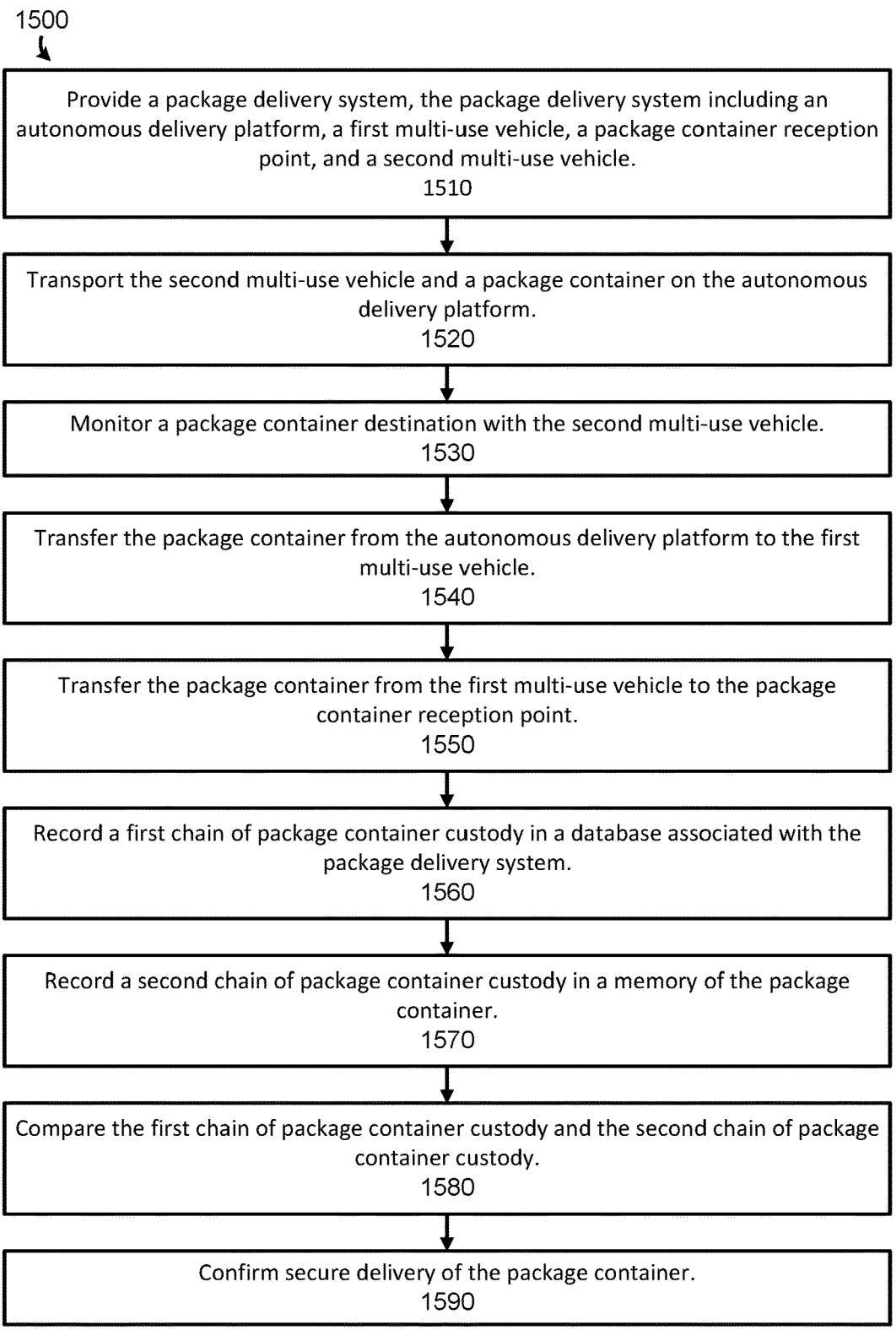
FIG. 15 is a flow diagram of a method for package delivery, according to some embodiments.

FIG. 15 is a flow diagram of a method 1500 of package delivery, according to some embodiments. At step 1510, a package delivery system is provided, which includes an autonomous delivery platform, a second multi-use vehicle, a package container reception point, and a first multi-use vehicle. At step 1520, the second multi-use vehicle and a package container are transported on the autonomous delivery platform. For example, the second multi-use vehicle may be coupled to the autonomous delivery platform while during a first portion of a last-mile delivery and deployed during a second portion of a last-mile delivery. At step 1530, a package container destination is monitored with the second multi-use vehicle. In some embodiments, the monitoring may include deploying the second multi-use vehicle. At step 1540, the package container is transferred from the autonomous delivery platform to the first multi-use vehicle. For example, the package container may be transferred via a mechanical interchange. Further, in some embodiments, the package container may be secured to the first multi-use vehicle via a pair of electromechanical interfaces. At step 1550, the package container is transferred from the first multi-use vehicle to the package container reception point. At step 1560, a first chain of package container custody is recorded in a database associated with the package delivery system, such as a memory onboard the autonomous delivery platform, or a server in wireless communication with the autonomous delivery platform. At step 1570, a second chain of package container custody is recorded in a memory of the package container. At step 1580, the first chain of package container custody and the second chain of package container custody are compared. In the case that the first chain and second chain are congruent, secure delivery of the package container may be confirmed at step 1590. In some embodiments, the first chain and second chain may not be coextensive. That is to say, the first chain may not embody a complete record of package container transfers. Accordingly, additional recorded chains of package custody may be required to confirm secure chain-of-custody delivery. However, in these examples, incongruences between chains, even in the case of impartial chains, may be indicative that secure delivery was compromised. In some embodiments, responsive to one or more indications that secure delivery was compromised, a package container may not be released to a package container reception point, or a distress signal may be transmitted.

Figure 16:
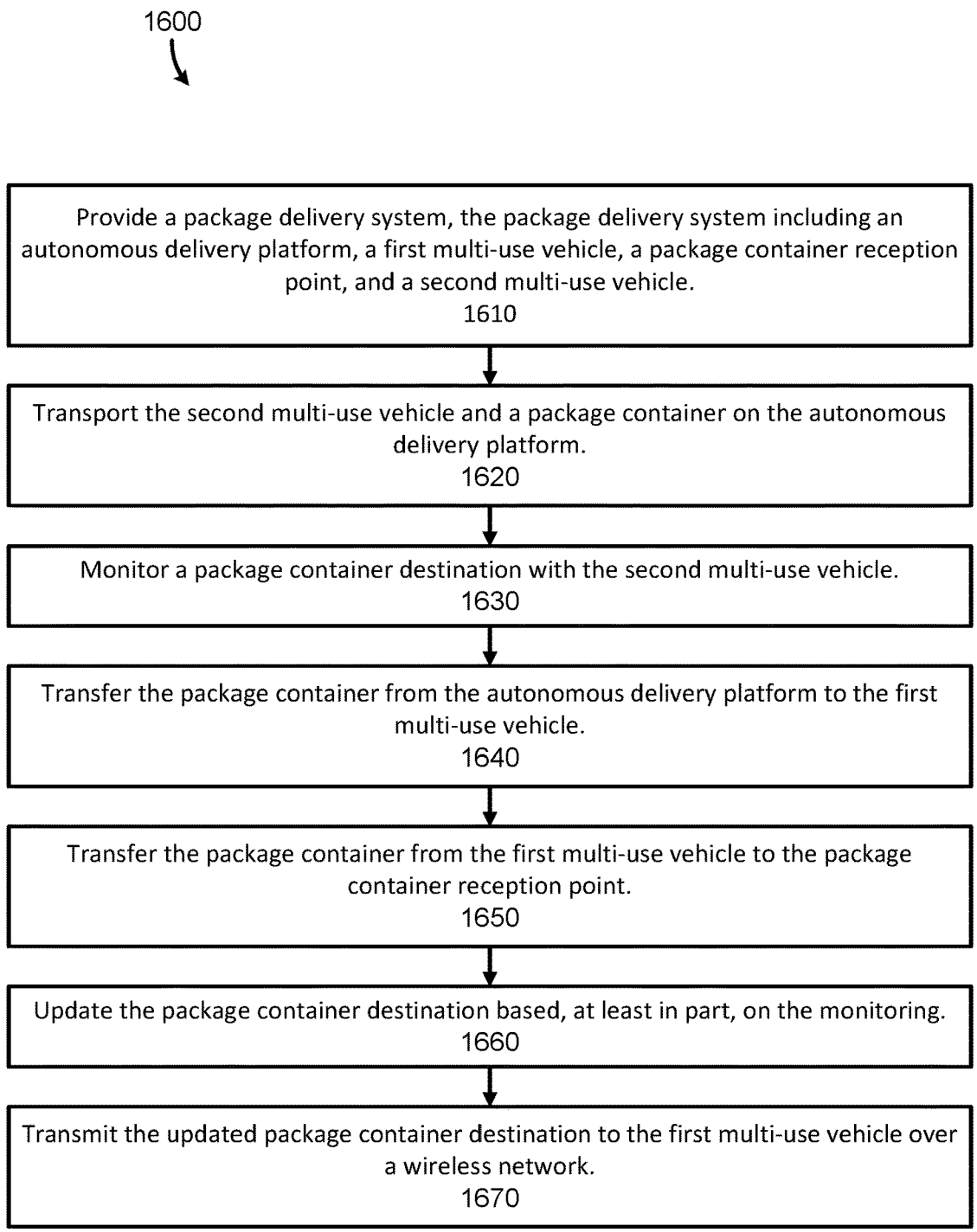
FIG. 16 is a flow diagram of a method for package delivery, according to some embodiments.

FIG. 16 is a flow diagram of a method 1600 of package delivery, according to some embodiments. At step 1610, a package delivery system is provided, which includes an autonomous delivery platform, a second multi-use vehicle, a package container reception point, and a first multi-use vehicle. At step 1620, the second multi-use vehicle and a package container are transported on the autonomous delivery platform. For example, the second multi-use vehicle may be coupled to the autonomous delivery platform while during a first portion of a last-mile delivery and deployed during a second portion of a last-mile delivery. At step 1630, a package container destination is monitored with the second multi-use vehicle. In some embodiments, the monitoring may include deploying the second multi-use vehicle. At step 1640, the package container is transferred from the autonomous delivery platform to the first multi-use vehicle. For example, the package container may be transferred via a mechanical interchange. Further, in some embodiments, the package container may be secured to the first multi-use vehicle via a pair of electromechanical interfaces. At step 1650, the package container is transferred from the first multi-use vehicle to the package container reception point. At step 1660, instead of releasing the package container to the package container reception point, the package container destination is updated based, at least in part, on the monitoring with the second multi-use vehicle. For example, in the case that the location and identifier of a package container reception point don't match, the package container destination may be updated to an alternate package container reception point. Alternatively, in the case that the identifier is correct, but the location is determined to be erroneous, the package container destination may be updated to correspond to the correct location of the package container reception point. At step 1670, the updated package container destination is transmitted to the first multi-use vehicle over a wireless network. For example, the update package container destination may be transmitted from the second multi-use vehicle or the autonomous delivery platform.

Figure 17:
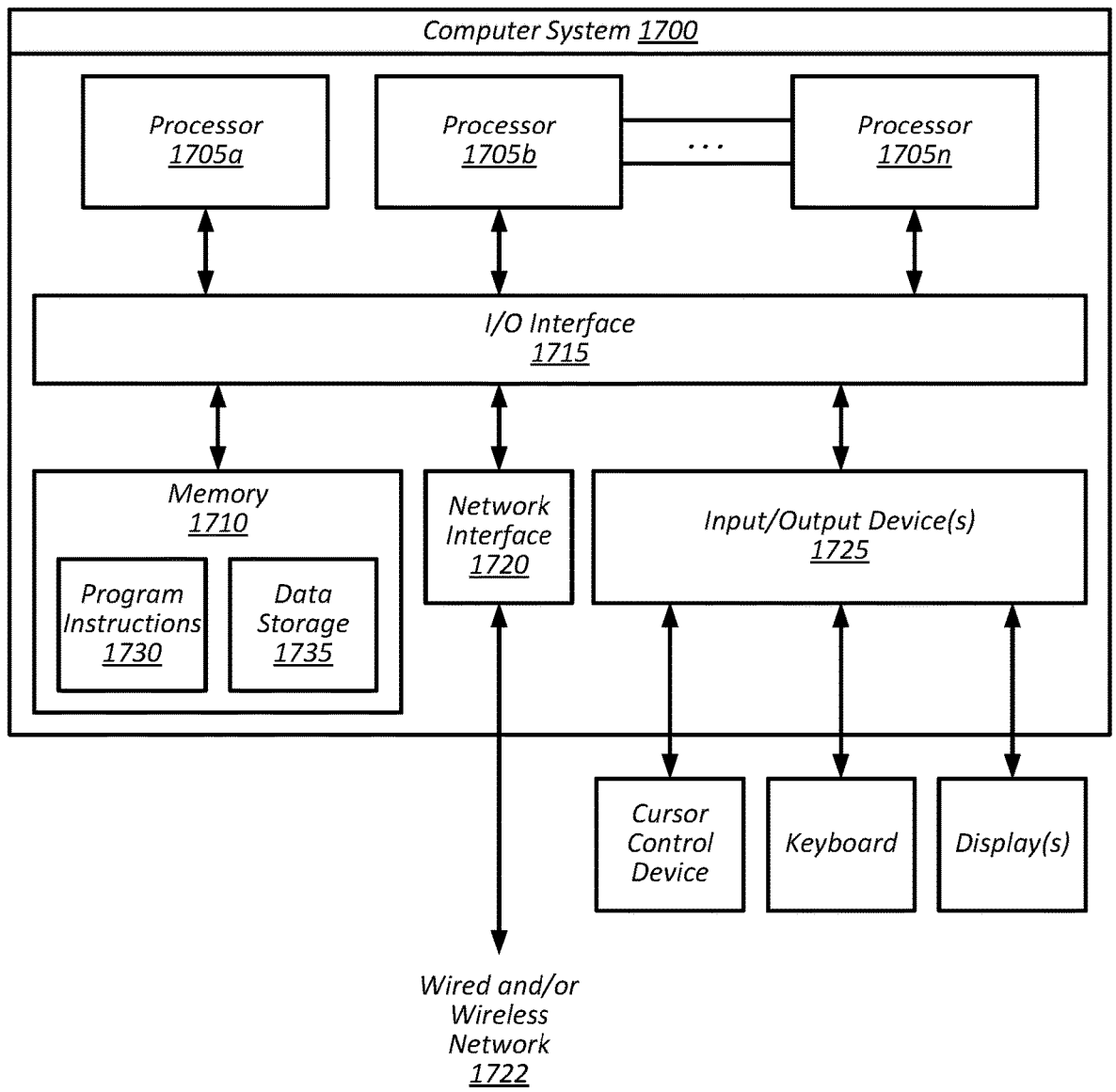
FIG. 17 is a block diagram of a computer system, according to some embodiments.

FIG. 17 illustrates an example computer system configured to implement aspects of the system and method for package delivery, in accordance with some embodiments. FIG. 17 illustrates a computer system 1700 that is configured to execute any or all of the embodiments described above. In different embodiments, computer system 1700 may be any of various types of devices, including, but not limited to, a computer embedded in a vehicle, a computer embedded in an appliance, a personal computer system, desktop computer, laptop, notebook, tablet, slate, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

Various embodiments of a system and method for package delivery, as described herein, may be executed on one or more computer systems 1700, which may interact with various other devices. Note that any component, action, or functionality described above with respect to FIGS. 1-16 may be implemented on one or more computers configured as computer system 1700 of FIG. 17, according to various embodiments. In the illustrated embodiment, computer system 1700 includes one or more processors 1705 coupled to a system memory 1710 via an input/output (I/O) interface 1715. Computer system 1700 further includes a network interface 1720 coupled to I/O interface 1715, and one or more input/output devices 1725, such as cursor control device, keyboard, and display(s). In some cases, it is contemplated that embodiments may be implemented using a single instance of computer system 1700, while in other embodiments multiple such systems, or multiple nodes making up computer system 1700, may be configured to host different portions or instances of embodiments. For example, in one embodiment some elements may be implemented via one or more nodes of computer system 1700 that are distinct from those nodes implementing other elements.

In various embodiments, computer system 1700 may be a uniprocessor system including one processor 1705*a*, or a multiprocessor system including several processors 1705*a*-1705*n* (e.g., two, four, eight, or another suitable number). Processors 1705 may be any suitable processor capable of executing instructions. For example, in various embodiments processors 1705 may be general-purpose or embedded processors implementing any of a variety of instruction set architectures (ISAs), such as the x86, PowerPC, SPARC, or MIPS ISAs, or any other suitable ISA. In multiprocessor systems, each of processors 1705 may commonly, but not necessarily, implement the same ISA.

System memory 1710 may be configured to store program instructions 1730 and/or existing state information and ownership transition condition data in data storage 1735 accessible by processor 1705. In various embodiments, system memory 1710 may be implemented using any suitable memory technology, such as static random access memory (SRAM), synchronous dynamic RAM (SDRAM), nonvolatile/Flash-type memory, or any other type of memory. In the illustrated embodiment, program instructions 1730 may be configured to implement a system for package delivery incorporating any of the functionality described above. In some embodiments, program instructions and/or data may be received, sent, or stored upon different types of computer-accessible media or on similar media separate from system memory 1710 or computer system 1700. While computer system 1700 is described as implementing the functionality of functional blocks of previous Figures, any of the functionality described herein may be implemented via such a computer system.

In one embodiment, I/O interface 1715 may be configured to coordinate I/O traffic between processor 1705, system memory 1710, and any peripheral devices in the device, including network interface 1720 or other peripheral interfaces, such as input/output devices 1725. In some embodiments, I/O interface 1715 may perform any necessary protocol, timing or other data transformations to convert data signals from one component (e.g., system memory 1710) into a format suitable for use by another component (e.g., processor 1705). In some embodiments, I/O interface 1715 may include support for devices attached through various types of peripheral buses, such as a variant of the Peripheral Component Interconnect (PCI) bus standard or the Universal Serial Bus (USB) standard, for example. In some embodiments, the function of I/O interface 1715 may be split into two or more separate components, such as a north bridge and a south bridge, for example. Also, in some embodiments some or all of the functionality of I/O interface 1715, such as an interface to system memory 1710, may be incorporated directly into processor 1705.

Network interface 1720 may be configured to allow data to be exchanged between computer system 1700 and other devices attached to a network 1722 (e.g., carrier or agent devices) or between nodes of computer system 1700. Network 1722 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1720 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Input/output devices 1725 may, in some embodiments, include one or more display terminals, keyboards, keypads, touchpads, scanning devices, voice, or optical recognition devices, or any other devices suitable for entering or accessing data by one or more computer systems 1700. Further, various other sensors may be included in the I/O devices 1725, such as imaging sensors, barometers, altimeters, LIDAR, or any suitable environmental sensor. Multiple input/output devices 1725 may be present in computer system 1700 or may be distributed on various nodes of computer system 1700. In some embodiments, similar input/output devices may be separate from computer system 1700 and may interact with one or more nodes of computer system 1700 through a wired or wireless connection, such as over network interface 1720.

As shown in FIG. 17, memory 1710 may include program instructions 1730, which may be processor-executable to implement any element or action described above. In one embodiment, the program instructions may implement the methods described above, such as the methods illustrated by FIGS. 10-16. In other embodiments, different elements and data may be included. Note that data storage 1735 may include any data or information described above.

Those skilled in the art will appreciate that computer system 1700 is merely illustrative and is not intended to limit the scope of embodiments. In particular, the computer system and devices may include any combination of hardware or software that can perform the indicated functions, including computers, network devices, Internet appliances, PDAs, wireless phones, pagers, GPUs, specialized computer systems, information handling apparatuses, etc. Computer system 1700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described below. In some embodiments, instructions stored on a computer-accessible medium separate from computer system 1700 may be transmitted to computer system 1700 via transmission media or signals such as electrical, electromagnetic, or digital signals, conveyed via a communication medium such as a network and/or a wireless link. Various embodiments may further include receiving, sending, or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

Thus, the disclosure provides, among other things, a system for package delivery, including an autonomous delivery platform, a second multi-use vehicle, a first multi-use vehicle, and a package container reception point. The autonomous delivery platform is configured for transporting a package in a package container. Various features and advantages of the disclosure are set forth in the following claims.

What is claimed is:

1. A system comprising:
   a first drone;
   a second drone;
   a vehicle to transport the first drone and the second drone, the vehicle comprising:
      a storage unit configured to store a plurality of package containers, each package container of the plurality of package containers associated with a corresponding destination, wherein each package container of the plurality of package containers includes a plurality of electromechanical interfaces, and wherein the first drone and the second drone are configured to electrically and mechanically couple to the electromechanical interfaces; and
      a package manipulator configured to move a first package container of the plurality of package containers from the storage unit to the first drone; and
   a package container reception point configured to couple to a first electromechanical interface of the plurality of electromechanical interfaces, wherein the package container reception point corresponds to a first destination associated with the first package container, wherein the first drone is configured to move the first package container from the vehicle to the first destination, and wherein the second drone is configured to provide data to the first drone, the data related to a route from the vehicle to the package container reception point.

2. The system of claim 1, wherein the first drone comprises a wheeled vehicle configured to deliver the package container to the package container reception point.

3. The system of claim 2, wherein the second drone is configured to move to the first drone responsive to the first drone transmitting a distress signal.

4. The system of claim 3, wherein the second drone is configured to provide power to the first drone responsive to the distress signal.

5. The system of claim 3, wherein the second drone is configured to couple to the first drone and move the first drone responsive to the distress signal.

6. The system of claim 1, wherein the second drone is an aerial vehicle.

7. A method comprising:
   receiving, at a controller of a vehicle, a distress signal from a first drone, wherein the vehicle transported the first drone to a location near a destination associated with a first package container and released the first drone to deliver the first package container to the destination, and wherein the first drone comprises a ground drone; and
   releasing, by the controller, a second drone from the vehicle responsive to the distress signal, wherein the second drone is configured to move the first drone responsive to the distress signal, and wherein the second drone comprises an aerial drone.

8. The method of claim 7, further comprising updating the destination of the first package container responsive to a malfunction of a package container reception point associated with a first destination, responsive to a mismatch between a first location and an identifier of the package container reception point associated with the first destination, responsive to detecting an erroneous location of the package container reception point, or any combination thereof.

9. The method of claim 7, wherein the aerial drone comprises a quadcopter.

10. The method of claim 7, further comprising recording, in a first memory associated with the vehicle, a chain of custody for the first package container.

11. The method of claim 7, wherein the first drone comprises a wheeled vehicle configured to drive the first package container to a package container reception point.

12. A method comprising:
   initiating, by a controller of a vehicle, movement of a package container of a plurality of package containers from a storage unit of the vehicle to a first drone, the vehicle configured to transport the first drone and a second drone;
   initiating, at the controller, coupling of a first electromechanical interface of a plurality of electromechanical interfaces of the package container to the first drone, wherein the first drone and the second drone are configured to electrically and mechanically couple to the plurality of electromechanical interfaces; and
   releasing, by the controller, the first drone from the vehicle with instructions for the first drone to move the package container to a package container reception point configured to couple to a second electromechanical interface of the plurality of electromechanical interfaces, the second drone configured to provide data to the first drone, wherein the data is related to a route from the vehicle to the package container reception point.

13. The method of claim 12, further comprising recording, in a memory associated with the vehicle, data related to a chain of custody for the package container.

14. The method of claim 12, further comprising receiving, at the vehicle, a pickup request from the package container after a carrier space of the package container has been emptied.

15. The method of claim 12, wherein the first drone comprises a wheeled vehicle configured to drive the package container to the package container reception point.

16. The method of claim 12, further comprising initiating release of the second drone while the first drone is released.

17. The method of claim 12, wherein the plurality of electromechanical interfaces is substantially similar.

18. The method of claim 12, wherein the second drone is an aerial vehicle.

19. The method of claim 18, wherein the vehicle determines the route to the package container reception point based on the data received from the second drone.

20. The method of claim 12, wherein a robotic arm of the vehicle includes a vehicle electromechanical interface to couple to a particular electromechanical interface of the package container, and wherein initiating the movement of the package container includes using the robotic arm to move the package container to the first drone to facilitate the coupling of the first electromechanical interface of the package container to the first drone.

* * * * *